United States Patent
MacNaughtan et al.

(10) Patent No.: US 8,737,985 B2
(45) Date of Patent: May 27, 2014

(54) METHODS AND SYSTEMS FOR ZONE CREATION AND ADAPTION

(75) Inventors: Malcolm David MacNaughtan, Cherrybrook (AU); Christopher Ridgway Drane, Pymble (AU); Stephen Frank Brown, West Ryde (AU); Craig Andrew Scott, Mortdale (AU)

(73) Assignee: WaveMarket, Inc., Emeryville, CA (US)

( * ) Notice: Subject to any disclaimer, the term of this patent is extended or adjusted under 35 U.S.C. 154(b) by 455 days.

(21) Appl. No.: 12/734,812

(22) PCT Filed: Nov. 26, 2008

(86) PCT No.: PCT/AU2008/001783
§ 371 (c)(1),
(2), (4) Date: May 25, 2010

(87) PCT Pub. No.: WO2009/067766
PCT Pub. Date: Jun. 4, 2009

(65) Prior Publication Data
US 2010/0248640 A1 Sep. 30, 2010

Related U.S. Application Data

(60) Provisional application No. 60/996,566, filed on Nov. 26, 2007.

(51) Int. Cl.
*H04W 4/00* (2009.01)
*H04W 24/00* (2009.01)

(52) U.S. Cl.
USPC ..... 455/422.1; 455/423; 455/425; 455/432.3; 455/433; 455/435.1; 455/435.2; 455/435.3; 455/436

(58) Field of Classification Search
USPC ........ 455/422.1, 423, 425, 432.3, 433, 435.1, 455/435.2, 435.3, 436
See application file for complete search history.

(56) References Cited

U.S. PATENT DOCUMENTS 5,045,861 A 9/1991 Duffett-Smith et al.
5,524,136 A 6/1996 Barnoy et al.
(Continued)

FOREIGN PATENT DOCUMENTS

AU 200066612 B2 10/2000
DE 29919376 U1 2/2000
(Continued)

OTHER PUBLICATIONS

International Search Report for PCT/AU2008/001783 dated Jan. 15, 2009.
(Continued)

*Primary Examiner* — Wen Huang
(74) *Attorney, Agent, or Firm* — Dovas Law, P.C.

(57) ABSTRACT

Methods and systems of updating a zone profile comprising obtaining a plurality of radio signal parameter measurements and, if the plurality of radio signal parameter measurements contains at least one measurement corresponding to a dominant element of the zone profile and if the plurality of radio signal parameter measurements contains at least one measurement corresponding to a candidate element (e.g., statistically unlikely element) of the zone profile, updating the profile by either adjusting an existing parameter value or by adding a new element to the zone profile corresponding to the candidate element.

25 Claims, 12 Drawing Sheets

(56) References Cited

U.S. PATENT DOCUMENTS

| | | | |
|---|---|---|---|
| 5,564,079 A | 10/1996 | Olsson | |
| 5,666,651 A | 9/1997 | Wang | |
| 5,905,953 A | 5/1999 | Liu et al. | |
| 5,950,125 A | 9/1999 | Buhrmann et al. | |
| 5,969,679 A | 10/1999 | Bolliger | |
| 5,999,126 A | 12/1999 | Ito | |
| 6,041,236 A | 3/2000 | Bernardin et al. | |
| 6,052,064 A | 4/2000 | Budnik et al. | |
| 6,061,021 A | 5/2000 | Zibell | |
| 6,073,089 A | 6/2000 | Baker et al. | |
| 6,088,598 A | 7/2000 | Marsolais | |
| 6,097,939 A | 8/2000 | Jacobs | |
| 6,104,344 A | 8/2000 | Wax et al. | |
| 6,167,265 A | 12/2000 | Kim et al. | |
| 6,185,422 B1 * | 2/2001 | Mattila | 455/434 |
| 6,201,499 B1 | 3/2001 | Hawkes et al. | |
| 6,205,326 B1 | 3/2001 | Tell et al. | |
| 6,263,208 B1 | 7/2001 | Chang et al. | |
| 6,266,534 B1 | 7/2001 | Raith et al. | |
| 6,269,246 B1 | 7/2001 | Rao et al. | |
| 6,330,600 B1 | 12/2001 | Matchefts et al. | |
| 6,356,763 B1 | 3/2002 | Kangas et al. | |
| 6,360,094 B1 | 3/2002 | Satarasinghe | |
| 6,393,294 B1 | 5/2002 | Perez-Breva et al. | |
| 6,411,819 B1 | 6/2002 | Gutowski | |
| 6,449,257 B1 | 9/2002 | Choi | |
| 6,449,486 B1 | 9/2002 | Rao | |
| 6,496,701 B1 | 12/2002 | Chen et al. | |
| 6,529,165 B1 | 3/2003 | Duffett-Smith et al. | |
| 6,556,842 B1 | 4/2003 | Ericsson | |
| 6,560,442 B1 | 5/2003 | Yost et al. | |
| 6,567,381 B1 | 5/2003 | Jeon et al. | |
| 6,591,116 B1 | 7/2003 | Laurila et al. | |
| 6,631,262 B1 | 10/2003 | Wee | |
| 6,711,404 B1 | 3/2004 | Arpee et al. | |
| 6,728,539 B2 | 4/2004 | Kuwahara | |
| 6,748,224 B1 | 6/2004 | Chen et al. | |
| 6,782,265 B2 | 8/2004 | Perez-Breva et al. | |
| 6,799,046 B1 | 9/2004 | Tang | |
| 6,834,180 B1 | 12/2004 | Marshall | |
| 6,856,805 B1 | 2/2005 | Raaf | |
| 6,859,654 B1 | 2/2005 | Reynolds et al. | |
| 6,947,734 B1 | 9/2005 | Toubassi | |
| 6,947,835 B2 | 9/2005 | Kaplan et al. | |
| 6,950,664 B2 | 9/2005 | Chen et al. | |
| 6,961,587 B1 | 11/2005 | Vilppula et al. | |
| 7,031,722 B2 | 4/2006 | Naghian | |
| 7,079,850 B2 | 7/2006 | Cameron | |
| 7,096,115 B1 | 8/2006 | Groth et al. | |
| 7,158,790 B1 | 1/2007 | Elliott | |
| 7,158,798 B2 | 1/2007 | Lee et al. | |
| 7,233,800 B2 | 6/2007 | Laroia et al. | |
| 7,289,763 B2 | 10/2007 | Dennison et al. | |
| 7,505,433 B2 | 3/2009 | Yaqub et al. | |
| 7,668,832 B2 | 2/2010 | Yeh et al. | |
| 7,697,920 B1 | 4/2010 | McClain | |
| 7,751,827 B2 | 7/2010 | Poykko et al. | |
| 7,835,301 B1 | 11/2010 | Maufer | |
| 2001/0022558 A1 | 9/2001 | Karr et al. | |
| 2002/0042268 A1 | 4/2002 | Cotanis | |
| 2002/0042269 A1 | 4/2002 | Cotanis | |
| 2002/0101834 A1 | 8/2002 | Stanley | |
| 2002/0111772 A1 | 8/2002 | Skidmore et al. | |
| 2002/0128019 A1 | 9/2002 | Ben-Yair et al. | |
| 2002/0164997 A1 | 11/2002 | Parry | |
| 2002/0168989 A1 | 11/2002 | Dooley et al. | |
| 2002/0173275 A1 | 11/2002 | Coutant | |
| 2002/0193150 A1 | 12/2002 | Pritchard | |
| 2003/0008668 A1 | 1/2003 | Perez-Breva et al. | |
| 2003/0032404 A1 | 2/2003 | Wager et al. | |
| 2003/0040318 A1 | 2/2003 | Fattouch | |
| 2003/0043941 A1 | 3/2003 | Johnson et al. | |
| 2003/0060214 A1 | 3/2003 | Hendrey et al. | |
| 2003/0078042 A1 | 4/2003 | Miriyala et al. | |
| 2003/0078055 A1 | 4/2003 | Smith et al. | |
| 2003/0109274 A1 | 6/2003 | Budka et al. | |
| 2003/0119501 A1 | 6/2003 | Kim | |
| 2003/0125031 A1 | 7/2003 | Sung Lim et al. | |
| 2003/0147362 A1 | 8/2003 | Dick et al. | |
| 2003/0148771 A1 | 8/2003 | de Verteuil | |
| 2003/0186710 A1 | 10/2003 | Muhonen et al. | |
| 2003/0190916 A1 * | 10/2003 | Celedon et al. | 455/437 |
| 2003/0208589 A1 | 11/2003 | Yamamoto | |
| 2004/0018835 A1 | 1/2004 | Myers et al. | |
| 2004/0037258 A1 | 2/2004 | Scherzer et al. | |
| 2004/0116111 A1 | 6/2004 | Saunders | |
| 2004/0132464 A1 | 7/2004 | Poykko et al. | |
| 2004/0152470 A1 | 8/2004 | Spain | |
| 2004/0157621 A1 | 8/2004 | Yamasaki et al. | |
| 2004/0160365 A1 | 8/2004 | Riley et al. | |
| 2004/0185822 A1 | 9/2004 | Tealdi et al. | |
| 2004/0199398 A1 | 10/2004 | Kubota | |
| 2004/0203717 A1 | 10/2004 | Wingrowicz | |
| 2004/0203880 A1 | 10/2004 | Riley | |
| 2004/0203885 A1 | 10/2004 | Quaid | |
| 2004/0225681 A1 | 11/2004 | Chaney et al. | |
| 2004/0248589 A1 | 12/2004 | Gwon et al. | |
| 2004/0259555 A1 | 12/2004 | Rappaport et al. | |
| 2005/0012613 A1 | 1/2005 | Eckstein et al. | |
| 2005/0040968 A1 | 2/2005 | Damarla et al. | |
| 2005/0044564 A1 | 2/2005 | Stopniewicz et al. | |
| 2005/0066325 A1 | 3/2005 | Mori et al. | |
| 2005/0113117 A1 | 5/2005 | Bolin et al. | |
| 2005/0134696 A1 | 6/2005 | Nath et al. | |
| 2005/0136938 A1 | 6/2005 | Kang | |
| 2005/0169183 A1 | 8/2005 | Lakkakorpi | |
| 2005/0192031 A1 | 9/2005 | Vare | |
| 2005/0202821 A1 | 9/2005 | Pischella | |
| 2005/0210342 A1 | 9/2005 | Schwagmann | |
| 2005/0227683 A1 | 10/2005 | Draluk et al. | |
| 2005/0239478 A1 | 10/2005 | Spirito | |
| 2005/0282540 A1 | 12/2005 | Motamedi et al. | |
| 2005/0282544 A1 | 12/2005 | Oommen et al. | |
| 2005/0283540 A1 | 12/2005 | Fux et al. | |
| 2006/0019665 A1 | 1/2006 | Aghvami et al. | |
| 2006/0019679 A1 | 1/2006 | Rappaport et al. | |
| 2006/0025068 A1 | 2/2006 | Regan et al. | |
| 2006/0025158 A1 | 2/2006 | Leblanc et al. | |
| 2006/0052057 A1 | 3/2006 | Persson et al. | |
| 2006/0064346 A1 | 3/2006 | Steenstra et al. | |
| 2006/0087425 A1 | 4/2006 | Haeberlen | |
| 2006/0205417 A1 | 9/2006 | Ju et al. | |
| 2006/0221901 A1 * | 10/2006 | Yaqub et al. | 370/331 |
| 2006/0227045 A1 | 10/2006 | Sheynblat | |
| 2006/0229090 A1 | 10/2006 | LaDue | |
| 2006/0234701 A1 | 10/2006 | Wang et al. | |
| 2006/0270421 A1 | 11/2006 | Phillips et al. | |
| 2007/0001808 A1 | 1/2007 | Kastelic et al. | |
| 2007/0001867 A1 | 1/2007 | Rowe et al. | |
| 2007/0087764 A1 | 4/2007 | Buckley et al. | |
| 2007/0121520 A1 | 5/2007 | Shrikhande et al. | |
| 2007/0123268 A1 | 5/2007 | Parata | |
| 2007/0208495 A1 | 9/2007 | Chapman et al. | |
| 2007/0232319 A1 * | 10/2007 | Bells et al. | 455/456.1 |
| 2007/0259670 A1 * | 11/2007 | Sakhpara | 455/452.2 |
| 2007/0270168 A1 | 11/2007 | Sheynblat | |
| 2007/0297346 A1 | 12/2007 | Huisman et al. | |
| 2008/0004037 A1 | 1/2008 | Achlioptas et al. | |
| 2008/0030345 A1 | 2/2008 | Austin et al. | |
| 2008/0061967 A1 | 3/2008 | Corrado | |
| 2008/0144082 A1 | 6/2008 | Kister | |
| 2008/0194235 A1 | 8/2008 | Dalsgaard | |
| 2009/0160939 A1 | 6/2009 | Fernandez et al. | |
| 2009/0182630 A1 | 7/2009 | Otto et al. | |
| 2009/0294538 A1 | 12/2009 | Wihlborg et al. | |
| 2010/0167725 A1 | 7/2010 | Noldus et al. | |
| 2011/0244919 A1 | 10/2011 | Aller et al. | |
| 2012/0253668 A1 | 10/2012 | Sheha et al. | |

FOREIGN PATENT DOCUMENTS

| | | |
|---|---|---|
| EP | 0431956 A2 | 7/1990 |
| EP | 0874248 A2 | 10/1998 |

(56) References Cited

FOREIGN PATENT DOCUMENTS

| | | |
|---|---|---|
| EP | 0936758 A2 | 8/1999 |
| EP | 0982964 A2 | 3/2000 |
| EP | 1030531 A1 | 8/2000 |
| EP | 1120632 B1 | 8/2001 |
| EP | 1175115 A2 | 1/2002 |
| EP | 1235076 A1 | 8/2002 |
| EP | 1271101 A2 | 1/2003 |
| EP | 1304897 A1 | 4/2003 |
| EP | 0767594 B1 | 11/2003 |
| EP | 1677562 A1 | 7/2006 |
| EP | 1137305 B1 | 1/2008 |
| EP | 2083576 A1 | 7/2009 |
| GB | 2352134 A | 1/2001 |
| GB | 2358500 A | 7/2001 |
| GB | 2364617 A | 1/2002 |
| JP | 07-255079 A | 10/1995 |
| JP | 08-265824 A | 10/1996 |
| JP | 2001-330657 A | 11/2001 |
| JP | 2004-104349 A | 4/2004 |
| WO | WO 92/02105 A1 | 2/1992 |
| WO | WO 93/15569 | 8/1993 |
| WO | WO 95/35636 A1 | 12/1995 |
| WO | WO 97/11384 A | 3/1997 |
| WO | WO 98/12885 A2 | 3/1998 |
| WO | WO 98/48578 A2 | 10/1998 |
| WO | WO 9843450 | 10/1998 |
| WO | WO 99/13662 A | 3/1999 |
| WO | WO 00/18148 A | 3/2000 |
| WO | WO 00/28755 A1 | 5/2000 |
| WO | WO 0049826 | 8/2000 |
| WO | WO 01/03372 A | 1/2001 |
| WO | WO 01/37601 | 5/2001 |
| WO | WO 01/99082 A2 | 12/2001 |
| WO | WO 02/47421 | 12/2001 |
| WO | WO 0195592 | 12/2001 |
| WO | WO 02/073997 A1 | 9/2002 |
| WO | WO 02/082850 | 10/2002 |
| WO | WO 03/087869 | 10/2003 |
| WO | WO 2004034721 | 4/2004 |
| WO | WO 2004/047315 A2 | 6/2004 |
| WO | WO 2004/079478 A2 | 9/2004 |
| WO | WO 2004/080105 A2 | 9/2004 |
| WO | WO 2004/084022 A2 | 9/2004 |
| WO | WO 2005/009020 A1 | 1/2005 |
| WO | WO 2005/109695 A1 | 11/2005 |
| WO | WO 2006/026816 A2 | 3/2006 |
| WO | WO 2006/053835 A1 | 5/2006 |
| WO | WO 2006/059188 A1 | 6/2006 |
| WO | WO 2006087438 A1 | 8/2006 |
| WO | WO 2006/096922 A1 | 9/2006 |
| WO | WO 2006/096923 A1 | 9/2006 |
| WO | WO 2006/105618 A1 | 10/2006 |
| WO | WO 2006/105619 A1 | 10/2006 |
| WO | WO 2006/112561 | 10/2006 |
| WO | WO 2006/125085 | 11/2006 |
| WO | WO 2007/017691 A1 | 2/2007 |
| WO | WO 2007/020635 A2 | 2/2007 |
| WO | WO 2007/040320 A1 | 4/2007 |
| WO | WO 2007040320 | 4/2007 |
| WO | WO 2007/048176 | 5/2007 |
| WO | WO 2007/048177 | 5/2007 |
| WO | WO 2007/051223 A1 | 5/2007 |
| WO | WO 2007/071271 A1 | 6/2007 |
| WO | WO 2007/102816 A1 | 9/2007 |
| WO | WO 2007/115777 A1 | 10/2007 |
| WO | WO 2008/055302 | 5/2008 |
| WO | WO 2008/059570 | 5/2008 |
| WO | WO 2008/109948 A1 | 9/2008 |
| WO | WO 2009/036497 | 3/2009 |
| WO | WO 2009/067766 | 6/2009 |
| WO | WO 2009080105 | 7/2009 |
| WO | WO 2009/124348 | 10/2009 |
| WO | WO 2009/124349 | 10/2009 |
| WO | WO 2010/022470 | 3/2010 |
| WO | WO 2010090558 | 8/2010 |

OTHER PUBLICATIONS

Doru-Petru Munteanu et al.; "Zone Profile Generation for Location Based Services and Traffic Analysis", 12$^{th}$ WSEAS International Conference on Communications, Heraklion, Greece, Jul. 23-25, 2008; p. 386-390.

M. Hata, "Empirical formula for propagation loss in land mobile radio services" IEEE Transactions on Vehicular Technology, vol. VT-29, pp. 317-325, Aug. 1980.

T. Roos, P. Myllymaki, and H. Tirri, "A statistical modeling approach to location estimation," IEEE Transactions on Mobile Computing vol. 1, pp. 59-69, Jan. 2002.

T. Halonen J. Romero and J. Melero, GSM, GPRS and EDGE Performance; Evolution Towards SG/UMTS. John Wiley and Sons, 2nd ed., 2003.

L.M. Correia, Wireless Flexible Personalized Communications: COST 259 European Co-Operation in Mobile Radio Research. Wiley 2001.

IEEE Vehicular Technology Society Committee on Radio Propagation Coverage Prediction for Mobile Radio Systems Operating in the 800/900 MHz frequency range IEEE Transactions on Vehicular Technology: Special Issue on Mobile Radio Propagation, vol. 37, pp. 3-72, Feb. 1988.

3rd Generation Partnership Program, "3GPP TR 25.942 Radio Frequency (RF) System Scenarios," tech. rep., 3GPP, 2004.

Schwartz et al., "On the Distribution and Moments of Power Sums with Logonormal Components", Bell Sys. Tech, J., vol. 61, No. 7, pp. 1441-1463.

Balis P. G. et al. "UTD-Based Model for Prediction of Propagation Path Loss and Shadowing Variability in Urban Mobile Environments" IEE Proceedings: Microwaves, Antennas and Propagation, IEE, Stevenage, Herts, GB, vol. 144 No. 5 Oct. 9, 1997, pp. 367-371 XP006008788 ISSN: 1350-2417.

W.C.Y. Lee, Mobile Communications Engineering. McGraw-Hill, 1982.

Bernardin et al., "Cell Radius Inaccuracy: A New Measure of Coverage Reliability", IEEE Transactions on Vehicular Technology, vol. 47, No. 4, Nov. 1998.

W.H. Press S. A. Teukolsky, W.T. Vetterling & B.P. Flannery, "Numerical Recipes in C++; The Art of Scientific Computing", 2nd Ed, Feb. 2002, Cambridge University Press.

C.R. Drane, Positioning Systems—A Unified Approach, Lecture Notes in Control and Infromation Sciences, Springer Verlag, Oct 1992.

P.L.H.A.S. Fischer, "Evaluation of Positioning Measurement Systems," T1P1.5/97-110, Dec. 1997.

A.M. Zoubir and B. Boobash, "The Bootstrap and Its Application in Signal Processing," IEEE Signal Processing Magazine, 15(1):56-76, Jan. 1998.

Martin Hellenbrandt, Rudolf Mathar and Scheibenbogen Markus, "Estimating Position and Velocity of Mobiles in a Cellular Radio Network," IEEE Transactions on Vehicular Technology, 46(1): 65-71, Feb. 1997.

Section 2.7 of Mobile Radio Communications 2nd Ed. Steele and Hanzo, IBSN 047197806X,J. Wiley & Sons Ltd., 1999.

B. Matsumori T1P1.5/98-600 "Radio Camera System and Location Fingerprinting Technology", Presentation Submission to Location Standards Working Group T1P1.5 by U.S. Wireless 1998.

Annex I of GSM 05.05 "Digital cellular Telecommunication System (Phase 2)", Radio Transmission and Reception, 2001.

S.R. Saunders & A. Aragon-Zavala, Antennas and Propagation for Wireless Communications Systems: 2nd Ed., Wiley 2007.

3GPP SA WG2, "Voice Call Continuity between CS and IMS Study" 3GPP TR 23.806 V7 0.0, 1, Dec. 2005, pp. 1-153, XP002385067.

Specification 3GPP TS 31.111—Sections 6.4, 6.616, 6.6.21 and 6.6. 22.

"Computational Geometry in C (Cambridge Tracts in Theoretical Computer Science)", Joseph O'Rourke, Cambridge University Press; 2000 edition, ISBN 0521649765.

European Search Report dated Nov. 4, 2010 for EP 08714391.3.
International Search Report dated Sep. 20, 2004 for PCT/AU2004/000983.

(56) References Cited

OTHER PUBLICATIONS

European Search Report dated Mar. 15, 2007 for EP 04737602.5.
International Search Report dated Dec. 5, 2005 for PCT/AU2005/001358.
International Search Report dated May 7, 2008 for PCT/AU2008/000344.
International Search Report dated Apr. 26, 2006 for PCT/AU2006/000347.
International Search Report dated Apr. 26, 2006 for PCT/AU2006/000348.
European Search Report dated Feb. 19, 2010 for EP 06721361.1.
International Search Report dated May 31, 2006 for PCT/AU2006/000479.
International Search Report dated Jun. 29, 2006 for PCT/AU2006/000478.
European Search Report dated Dec. 22, 2009 for EP 06721360.3.
European Search Report dated Jul. 23, 2010 for EP 06705018.7.
International Search Report dated Jan. 24, 2007 for PCT/AU2006/001479.
International Search Report dated Dec. 19, 2006 for PCT/AU2006/001576.
International Search Report dated Feb. 19, 2008 for PCT/AU2007/001706.
International Search Report dated Nov. 24, 2008 for PCT/AU2008/001374.
OMA Download Architecture—Version 1.0, Jun. 25, 2004.
International Search Report dated Jun. 1, 2009 for PCT/AU2009/000436.
International Search Report dated Nov. 25, 2009 for PCT/AU2009/001123.
International Search Report dated May 11, 2009 for PCT/AU2009/000438.
European Search Report dated Feb. 19, 2009 for EP 06705017.9.
Mir et. al, "A Zone-Based Location Service for Mobile Ad Hoc Networks", 1NCC 2004, Jun. 2004.
3GPP TR05.08, "Radio Subsystem Link Control", Nov. 2005.
3GPP SA WG2, "Voice Call Continuity between CS and IMS Study" 3GPP TR 23.806 V7 0.0, Dec. 1, 2005, pp. 1-153, XP002385067.
Specification 3GPP TS 23.048, "Technical Specification Group Core Network and Terminals; Security Mechanisms for the (U)SIM Application Toolkit", 2005-2006.
Specification 3GPP TS 25.304 "User Equipment (UE) Procedures in Idle Mode and Procedures for Cell Reselection in Connected Mode", 2011.
Specification 3GPP TS 03.22, "Radio Access Network; Functions Related to Mobile Station(MS) in Idle Mode and Group Receive Mode", 1999.
International Search Report of PCT/AU2006/001577 dated Nov. 28, 2006.
International Search Report dated Nov. 3, 2011 for PCTAU2011/001038.
European Search Report dated Mar. 2, 2012 for European Patent Application 09729670.1.
European Search Report dated Feb. 24, 2012 for European Patent Application 09729862.4.
European Search Report dated Feb. 22, 2012 for European Patent Application 08714391.3.
European Search Report dated Mar. 12, 2012 for European Patent Application 06790414.4.
European Search Report dated Mar. 9, 2012 for European Patent Application 08800009.6.
European Search Report dated Mar. 12, 2012 for European Patent Application 06804431.2.
European Search report dated Jul. 25, 2012 for European Patent Application 06790349.2.

\* cited by examiner

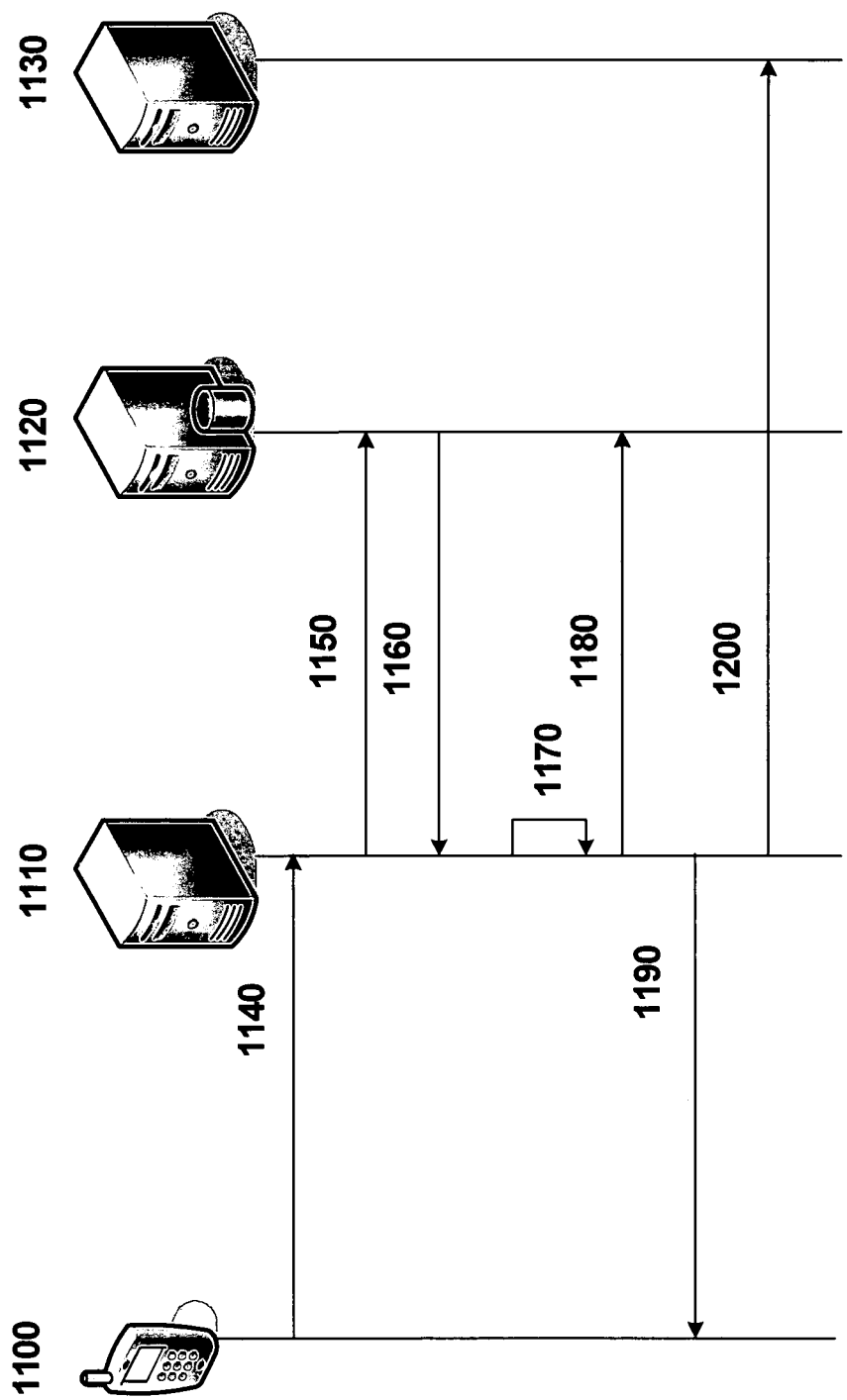

METHODS AND SYSTEMS FOR ZONE CREATION AND ADAPTION

PRIORITY CLAIM

This application is the U.S. National Phase application of International Application No. PCT/AU2008/001783, filed Nov. 26, 2008, which designates the United States and was published in English, which in turn claims priority from U.S. Provisional Patent Application No. 60/996,566, filed on Nov. 26, 2007. The foregoing related applications, in their entirety, are hereby incorporated by reference.

CROSS-REFERENCE TO RELATED APPLICATIONS

The present application is related to the following co-pending patent applications:

PCT/AU2005/001358 entitled "Radio Mobile Unit Location System"

PCT/AU2006/000347 entitled "Enhanced Mobile Location Method and System"

PCT/AU2006/000348 entitled "Enhanced Mobile Location"

PCT/AU2006/000478 entitled "Enhanced Terrestrial Mobile Location"

PCT/AU2006/000479 entitled "Mobile Location"

PCT/AU2008/000344 entitled "Enhanced Zone Determination."

The entire content of each of these applications is hereby incorporated by reference.

Furthermore, the entire contents of the following references is hereby incorporated by reference. W. C. Y. Lee, Mobile Communications Engineering, McGraw-Hill, 1982, and P. L. H. A. S. Fischer, "Evaluation of positioning measurement systems", T1P1.5/97-110, December 1997, and IEEE VTS committee, "Coverage prediction for mobile radio systems operating in the 800/900 MHz frequency range", IEEE Transactions on VTC, Vol. 37, No. 1, February 1998, 3GPP TS 05.08, and C. R. Drane, Positioning Systems, A Unified Approach, Springer Verlag, 1992.

BACKGROUND

In mobile radio communications, service providers sometimes choose to modify the provision of one or more services based on geographic location. One example is a home zone service where a mobile phone user may receive a discounted tariff when making calls from the vicinity of his or her home. Various systems and methods for defining geographic zones and monitoring the location of mobile radio terminals with respect to these zones currently exist.

A common characteristic of these methods is that the definition of the zone was typically derived at service initiation. While additional methods may exist for making subsequent adjustments to the zone definition, these adjustments are generally in response to either a requirement to change the zone area or else to accommodate changes in the configuration of the radio network.

While these methods may enable zones to be defined and monitored in a variety of radio conditions, there are some radio conditions which can degrade the zone performance. In some of these instances, a common solution is to expand the zone definitions to accommodate these radio conditions. However, this expansion may result in a larger zone size which in many cases is undesirable.

Embodiments of the present disclosure provide systems and methods for using radio measurements collected during the ongoing monitoring of the zone to refine the zone definition, thereby preserving an acceptable zone reliability with minimal compromise in increased zone size. Embodiments of the present disclosure provide systems and methods for using radio measurements collected to create and refine the zone definition on an ongoing basis. The limitations described in the previous paragraphs and other limitations can be overcome using systems, methods and devices in which radio measurements collected during the ongoing monitoring of the zone can be used to create and refine the zone definition on an ongoing basis. For the foregoing reasons, there is a need for a location based systems, methods and devices that can either define or refine the zone on an ongoing basis.

SUMMARY

In certain embodiments, the methods and systems disclosed comprise storing a zone profile having a plurality of elements; obtaining a plurality of radio signal parameter measurements; modifying an existing profile element corresponding to at least one low priority element of the zone profile if the plurality of radio signal parameter measurements contains measurements corresponding to at least one dominant element of the zone profile that is sufficiently adjacent to measurements corresponding to the at least one low priority element; and adding a new element to the zone profile corresponding to at least one missing element of the zone profile if the plurality of radio signal parameter measurements contains measurements corresponding to at least one dominant element of the zone profile that is sufficiently adjacent to measurements corresponding to the at least one missing element.

In certain embodiments, the methods and systems disclosed comprise storing a zone profile having at least one element; obtaining a plurality of radio signal parameter measurements; and modifying a plurality of existing profile elements corresponding to a plurality of low priority elements of the zone profile if the plurality of radio signal parameter measurements contains measurements corresponding to at least one dominant element of the zone profile that is sufficiently adjacent to measurements corresponding to the plurality of low priority elements; and adding a plurality of new elements to the zone profile corresponding to a plurality of missing elements of the zone profile if the plurality of radio signal parameter measurements contains measurements corresponding to at least one dominant element of the zone profile that is sufficiently adjacent to measurements corresponding to the plurality of missing elements.

In certain embodiments, the methods and systems disclosed comprise storing a zone profile having a plurality of elements; obtaining a plurality of radio signal parameter measurements; and modifying an existing profile element corresponding to at least one low priority element of the zone profile if the plurality of radio signal parameter measurements contain measurements corresponding to at least one dominant element of the zone profile sufficiently adjacent to measurements corresponding to the at least one low priority element.

In certain embodiments, the methods and systems disclosed comprise storing a zone profile having a plurality of elements; obtaining a plurality of radio signal parameter measurements; and adding a new element to the zone profile corresponding to at least one missing element of the zone profile if the plurality of radio signal parameter measurements contain measurements corresponding to at least one dominant element of the zone profile sufficiently adjacent to measurements corresponding to the at least one missing element.

In certain embodiments, a SIM card is disclosed that is configured to perform a method characterized by the steps of storing a zone profile having a plurality of elements; obtaining a plurality of radio signal parameter measurements; modifying an existing profile element corresponding to at least one low priority element of the zone profile if the plurality of radio signal parameter measurements contains measurements corresponding to at least one dominant element of the zone profile that is sufficiently adjacent to measurements corresponding to the at least one low priority element; and adding a new element to the zone profile corresponding to at least one missing element of the zone profile if the plurality of radio signal parameter measurements contains measurements corresponding to at least one dominant element of the zone profile that is sufficiently adjacent to measurements corresponding to the at least one missing element.

In certain embodiments, an applet in a processor readable memory is disclosed that is configured to perform a method characterized by the steps of storing a zone profile having a plurality of elements; obtaining a plurality of radio signal parameter measurements; modifying an existing profile element corresponding to at least one low priority element of the zone profile if the plurality of radio signal parameter measurements contains measurements corresponding to at least one dominant element of the zone profile that is sufficiently adjacent to measurements corresponding to the at least one low priority element; and adding a new element to the zone profile corresponding to at least one missing element of the zone profile if the plurality of radio signal parameter measurements contains measurements corresponding to at least one dominant element of the zone profile that is sufficiently adjacent to measurements corresponding to the at least one missing element.

In certain embodiments, devices are disclosed in which at least one zone profile is stored, the at least one zone profile having a plurality of elements; in which a plurality of radio signal parameter measurements are taken; and if the plurality of radio signal parameter measurements contains at least one measurement corresponding to at least one dominant element of the profile adjacent to at least one measurement corresponding to a weak or missing element of the zone profile, an existing profile element corresponding to the low priority element is modified and/or a new element corresponding to the missing element is added to the zone profile. In certain aspects, the devices may be within the zone when the adaptation is performed or they may be outside the zone when the adaptation is performed.

In certain embodiments, the methods and systems disclosed comprise storing a zone profile having a plurality of profile elements, wherein each profile element includes a cell ID associated with a priority; obtaining a plurality of cell ID measurements; modifying an existing profile element having a low priority if the plurality of cell ID measurements contains measurements corresponding to at least one dominant element of the zone profile that is sufficiently adjacent to measurements corresponding to the existing profile element having a low priority; adding to the zone profile a new profile element having a cell ID that is not included in any profile element of the zone profile if the plurality of cell ID measurements contains measurements corresponding to at least one dominant element of the zone profile that is sufficiently adjacent to measurements corresponding to the cell ID that is not included in any profile element of the zone profile; and transmitting the zone profile to a server.

In certain embodiments, the methods and systems disclosed comprise receiving a zone profile having a plurality of profile elements, wherein each profile element includes a cell ID associated with a priority, wherein an existing profile element having a low priority was modified because a plurality of cell ID measurements collected by a mobile radio terminal contained measurements corresponding to at least one dominant element of the zone profile that was sufficiently adjacent to measurements corresponding to the existing profile element having a low priority, or wherein a new profile element having a cell ID that was not included in any profile element of the zone profile was added to the zone profile because the plurality of cell ID measurements contained measurements corresponding to at least one dominant element of the zone profile that was sufficiently adjacent to measurements corresponding to the cell ID that was not included in any profile element of the zone profile; storing the zone profile; and transmitting the zone profile to a mobile radio terminal associated with the zone profile.

In certain embodiments, the methods and systems disclosed comprise storing a zone profile having a plurality of profile elements, wherein each profile element includes a cell ID associated with a priority; obtaining a plurality of cell ID measurements; determining a zone status change of the mobile radio terminal by comparing the plurality of cell ID measurements to the zone profile; transmitting the plurality of cell ID measurements and an indication of the zone status change to a server; receiving an updated zone profile wherein an existing profile element having a low priority was modified because the plurality of cell ID measurements contained measurements corresponding to at least one dominant element of the zone profile that was sufficiently adjacent to measurements corresponding to the existing profile element having a low priority, or wherein a new profile element having a cell ID that was not included in any profile element of the zone profile was added to the zone profile because the plurality of cell ID measurements contained measurements corresponding to at least one dominant element of the zone profile that was sufficiently adjacent to measurements corresponding to the cell ID that was not included in any profile element of the zone profile; storing the updated zone profile.

In certain embodiments, the methods and systems disclosed comprise storing a zone profile having a plurality of profile elements, wherein each profile element includes a cell ID associated with a priority; receiving a plurality of cell ID measurements; modifying an existing profile element having a low priority if the plurality of cell ID measurements contains measurements corresponding to at least one dominant element of the zone profile that is sufficiently adjacent to measurements corresponding to the existing profile element having a low priority; adding to the zone profile a new profile element having a cell ID that is not included in any profile element of the zone profile if the plurality of cell ID measurements contains measurements corresponding to at least one dominant element of the zone profile that is sufficiently adjacent to measurements corresponding to the cell ID that is not included in any profile element of the zone profile; and transmitting the zone profile to an associated mobile radio terminal.

In certain embodiments, the methods and systems disclosed comprise storing a zone profile having a plurality of profile elements, wherein each profile element includes a value of a radio signal parameter; obtaining a plurality of radio signal parameter measurements; modifying an existing profile element having a low priority if the plurality of radio signal parameter measurements contains measurements corresponding to at least one dominant element of the zone profile that is sufficiently adjacent to measurements corresponding to the existing profile element having a low priority; adding to the zone profile a new profile element corresponding to a cell which is not already represented by any profile element of the zone profile if the plurality of radio signal parameter measurements contains measurements corresponding to at least one dominant element of the zone profile that is sufficiently adjacent to measurements corresponding to the cell that is not represented by any profile element of the zone profile; and transmitting the zone profile to a server.

In certain embodiments, the methods and systems disclosed comprise receiving a zone profile having a plurality of profile elements, wherein each profile element includes a value of a radio signal parameter, wherein an existing profile element having a low priority was modified because a plurality of radio signal parameter measurements collected by a mobile radio terminal contained measurements corresponding to at least one dominant element of the zone profile that was sufficiently adjacent to measurements corresponding to the existing profile element having a low priority, or wherein a new profile element corresponding to a cell that was not already represented by any profile element was added to the zone profile because the plurality of radio signal parameter measurements contained measurements corresponding to at least one dominant element of the zone profile that was sufficiently adjacent to measurements corresponding to the cell that was not represented by any profile element; storing the zone profile; and transmitting the zone profile to a mobile radio terminal associated with the zone profile.

In certain embodiments, the methods and systems disclosed comprise storing a zone profile having a plurality of profile elements, wherein each profile element includes a value of a radio signal parameter; obtaining a plurality of radio signal parameter measurements; determining a zone status change of the mobile radio terminal by comparing the plurality of radio signal parameter measurements to the zone profile; transmitting the plurality of radio signal parameter measurements and an indication of the zone status change to a server; receiving an updated zone profile wherein an existing profile element having a low priority was modified because the plurality of radio signal parameter measurements contained measurements corresponding to at least one dominant element of the zone profile that was sufficiently adjacent to measurements corresponding to the existing profile element having a low priority, or wherein a new profile element corresponding to a cell that was not already represented by any profile element was added to the zone profile because the plurality of radio signal parameter measurements contained measurements corresponding to at least one dominant element of the zone profile that was sufficiently adjacent to measurements corresponding to the cell that was not represented by any profile element; and storing the updated zone profile.

In certain embodiments, the methods and systems disclosed comprise storing a zone profile having a plurality of profile elements, wherein each profile element includes a value of a radio signal parameter; receiving a plurality of radio signal parameter measurements; modifying an existing profile element having a low priority if the plurality of radio signal parameter measurements contains measurements corresponding to at least one dominant element of the zone profile that is sufficiently adjacent to measurements corresponding to the existing profile element having a low priority; adding to the zone profile a new profile element corresponding to a cell which is not already represented by any profile element of the zone profile if the plurality of radio signal parameter measurements contains measurements corresponding to at least one dominant element of the zone profile that is sufficiently adjacent to measurements corresponding to the cell that is not represented by any profile element of the zone profile; and transmitting the zone profile to an associated mobile radio terminal.

In certain embodiments, the methods and systems disclosed comprise storing a zone profile having a plurality of profile elements, wherein each profile element includes a value of a radio signal parameter; obtaining a plurality of radio signal parameter measurements and at least one non-cellular radio network signal; determining a zone status change of the mobile radio terminal by comparing the plurality of radio signal parameter measurements to the zone profile; modifying an existing profile element having a low priority if the at least one non-cellular radio network signal indicates that a zone adaptation is required; adding to the zone profile a new profile element having a radio signal parameter value that is not included in any profile element of the zone profile if the at least one non-cellular radio network signal indicates that a zone adaptation is required; and transmitting the zone profile to a server.

In certain embodiments, the methods and systems disclosed comprise receiving a zone profile having a plurality of profile elements, wherein each profile element includes a value of a radio signal parameter, wherein an existing profile element having a low priority was modified because at least one non-cellular radio network signal indicated that a zone adaptation was required, or wherein a new profile element having a radio signal parameter value that was not included in any profile element was added to the zone profile because at least one non-cellular radio network signal indicated that a zone adaptation was required; storing the zone profile; and transmitting the zone profile to a mobile radio terminal associated with the zone profile.

In certain embodiments, the methods and systems disclosed comprise storing a zone profile having a plurality of profile elements, wherein each profile element includes a value of a radio signal parameter; obtaining a plurality of radio signal parameter measurements and at least one non-cellular radio network signal; determining a zone status change of the mobile radio terminal by comparing the plurality of radio signal parameter measurements to the zone profile; transmitting the plurality of radio signal parameter measurements, an indication of the zone status change to a server, and the at least one non-cellular radio network signal; receiving an updated zone profile wherein an existing profile element having a low priority was modified because the at least one non-cellular radio network signal indicated that a zone adaptation was required, or wherein a new profile element having a radio signal parameter value that was not included in any profile element was added to the zone profile because the at least one non-cellular radio network signal indicated that a zone adaptation was required; and storing the updated zone profile.

In certain embodiments, the methods and systems disclosed comprise storing a zone profile having a plurality of profile elements, wherein each profile element includes a value of a radio signal parameter; receiving a plurality of radio signal parameter measurements and at least one non-cellular radio network signal; modifying an existing profile element having a low priority if the at least one non-cellular radio network signal indicates that a zone adaptation is required; adding to the zone profile a new profile element having a radio signal parameter value that is not included in any profile element of the zone profile if the at least one non-cellular radio network signal indicates that a zone adaptation is required; and transmitting the zone profile to an associated mobile radio terminal.

In certain embodiments, the methods and systems of updating a zone profile in a mobile radio terminal are characterized by the steps of storing a zone profile having a plurality of elements, wherein the zone profile is associated with a zone; obtaining a plurality of radio signal parameter measurements; and modifying at least one existing profile element or adding at least one profile element in order to increase the stability or reliability of the zone.

BRIEF DESCRIPTION OF THE DRAWINGS

These and other features, aspects, and advantages disclosed herein will become better understood with regard to the following description, appended claims, and accompanying drawings where:

FIG. 11 illustrates an exemplary messaging diagram in accordance with certain embodiments.

DESCRIPTION

Figure 1:
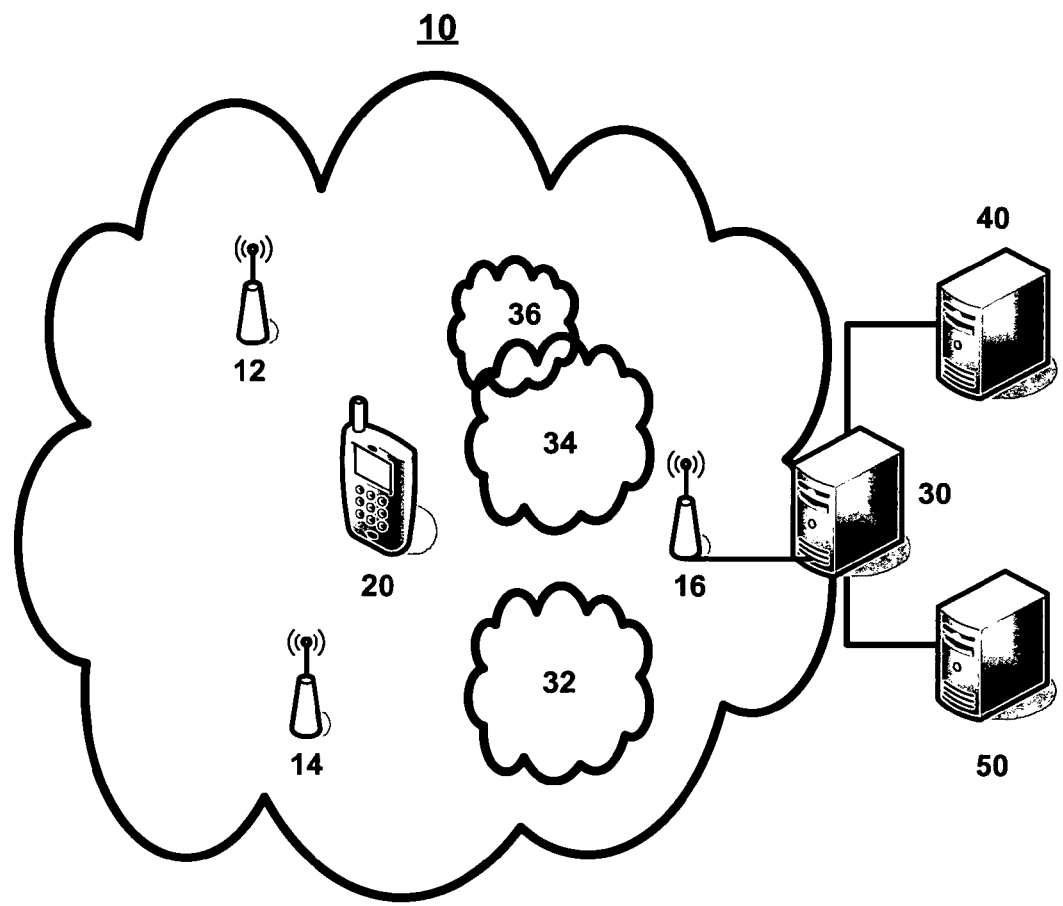
FIG. 1 illustrates a radio communications network in which zones are defined in accordance with certain embodiments.

Embodiments of the present disclosure will now be described in detail; examples of which are illustrated in the accompanying drawings. The examples and embodiments are provided by way of explanation only and are not to be taken as limiting to the scope of the inventions. Furthermore, features illustrated or described as part of one embodiment may be used with one or more other embodiments to provide a further new combination. It will be understood that the present inventions will cover these variations and embodiments as well as variations and modifications that would be understood by the person skilled in the art.

Throughout the specification, the terms "mobile radio terminal," "zone," "zone profile," "zone status," "zone reliability," "leakage," "unreliability," and "instability" will be used. "Mobile radio terminal" is used synonymously with terms such as "mobile station," "mobile phone," "user equipment," "cell phone," or "handset" and encompasses any kind of mobile radio terminal including Personal Digital Assistants (PDAs), laptop and other mobile computers, and pagers. A "zone" is defined as a geographic region within a radio telecommunications network. As described in more detail below, a "zone profile" is a quantitative characterization of the radio parameters that may be measured by a mobile terminal located within the zone. "Zone status" is a determination of whether a mobile radio terminal is inside or outside of a given zone.

Zone detection systems may exhibit some errors in determining zone status. "Zone reliability" is the degree to which, when the mobile radio terminal is within a specified zone, the system correctly returns an in-zone indication. "Unreliability" is the degree to which a zone detection system erroneously reports an out-of-zone indication when the mobile radio terminal is actually inside the zone. "Leakage" denotes the degree to which a zone detection system erroneously returns an in-zone indication when the mobile radio terminal is actually outside a specified zone.

There may be many causes for leakage and unreliability in radio terminal zone detection systems. Some causes may be characteristic of the zone detection system while others may be particular local characteristics of the geographical area or even the radio network configuration. The factors causing unreliability and leakage are often random therefore unreliability and leakage are often defined in statistical terms. One suitable measure may be an average percentage reliability. For example, a system which exhibits a reliability of 80% would return a correct in-zone indication 80% of the time that a terminal is actually situated within the zone. Accordingly, such a system would exhibit an unreliability of 20%; meaning that 20% of the time the system would return an out-of-zone indication when the terminal was actually within the zone. Note, however, that in certain aspects leakage is not necessarily directly correlated with unreliability.

A related problem that may be observed with zone detection systems is "instability". This error occurs when, despite the terminal remaining either within or outside the zone, the zone status indication returned by the system changes. Instability may be accompanied by unreliability, but need not necessarily be. For an example in which unreliability is relatively low but instability is high, consider a system monitoring the location of a radio terminal in a zone. Assume that for a 24 hour period, the terminal actually remained within the zone. Assume further that during this period the zone detection system returns an in-zone indication for 10 minutes, an out-of-zone indication for 5 seconds, and then an in-zone indication for 10 minutes, constantly repeating the same cycle. The unreliability in this example would be relatively low (5/605=0.8%). However the system or zone could be described as unstable due to the repeated changes in state.

Embodiments of the present disclosure include systems wherein a mobile radio terminal's location with respect to a zone is being monitored with the aid of a profile characterizing the zone. The system collects radio signal measurements to monitor the zone status of a mobile radio terminal—i.e., whether the mobile radio terminal is inside or outside of a zone. In certain embodiments, the system may perform additional analyses on the collected radio parameter measurements if desired. For example, additional analysis may be performed when a mobile radio terminal transmits a series of radio parameter measurements to a network server, or when the mobile radio terminal acquires at least one new radio parameter measurement. If the radio parameter measurements contain a dominant element (or elements) determined to be sufficiently adjacent to a candidate element (or elements), then the system adapts the profile. Candidate elements may be defined as low priority elements, missing elements, or combinations thereof in the zone profile.

For example, in certain embodiments, the methods, systems and devices disclosed could initially determine a radio terminal is in within the zone, and thereafter, after further analysis of the collected radio signal measurements determine that the terminal was actually out-of-zone. In some aspects, the methods, systems, and devices would adapt the profile by removing or downgrading the priority of any spurious elements. If the collected radio signal measurements contain adjacent sets of measurements corresponding to at least one dominant element and at least one low priority element and/or at least one missing element of the zone profile, then the system adapts the profile. In certain aspects, it is possible to have multiple adaptations from at least one set of measurements that could arise from multiple weak cells, multiple missing cells, or a combination thereof.

Certain embodiments disclosed reduce the likelihood of unreliability or instability in zone status monitoring. A related result is the detection of inconsistencies between the profile and real world conditions and to perform the necessary adjustments to the profile. For instance, in the case of a cell which is not currently in the profile, but which may serve mobile radio terminals within the zone, certain embodiments disclosed can detect this and adapt the profile, adding an extra entry corresponding to that cell into the profile with an appropriate weight.

FIG. 1 shows an exemplary radio communications network 10 having transmitters or base transceiver stations 12, 14, and 16 and in which three zones are defined: Zone A (32), Zone B (34), and Zone C (36); mobile radio terminal 20 executing a zone provisioning and monitoring application; and a zone server 30. In certain embodiments, a single zone or multiple zones can be defined and supported simultaneously, including for example, home, work, city districts and other zones. These zones may overlap completely or partially and/or may be contained entirely within another zone. The zone sizes may be any suitable size for the application. Additionally, embodiments disclosed herein are suitable for monitoring the location of a plurality of mobile terminals, relative to one or more zones, with improved resolution both in time and/or location. In certain embodiments, the reliability of such the zone determinations will be at least about 50%, at least about 65%, at least about 75%, at least about 80%, at least about 85%, at least about 90%, at least about 95%, at least about 98%, at least about 99%, or at least about 99.5%. Furthermore, it is to be understood that different zones may have different reliability. In certain embodiments, the reliability of such the zone determinations will be between 50% and 100%, between 50% and 99%, between 75% and 99%, between 75% and 100%, between 85% and 100%, between 85% and 98%, between 90% and 100%, between 90% and 99%, between 95% and 99%, between 95% and 100%, or between 97% and 100%. In certain embodiments, the reliability of such the zone determinations will be at least about 30%, about 50%, about 65%, about 75%, about 80%, 85%, about 90%, about 95%, about 98%, about 99%, or about 99.5% and these reliabilities will be present in at least 10%, 15%, 20%, 35%, 50%, 65%, 75%, 85%, 95%, or 100% of the zones. Furthermore, it is to be understood that different zones within a particular system or network may have different reliability. The zone sizes may in certain embodiments disclosed herein be combined with any of the above reliability percentages. For instance, a zone size of between 5 $m^2$ and 20 $m^2$, between 10 $m^2$ and 30 $m^2$, between 20 $m^2$ and 50 $m^2$, between 25 $m^2$ and 200 $m^2$, between 30 $m^2$ and 500 $m^2$, between 50 $m^2$ and 1500 $m^2$, between 100 $m^2$ and 2000 $m^2$, between 150 $m^2$ and 2500 $m^2$, between 10 $m^2$ and 3500 $m^2$, or between 10 $m^2$ and 5000 $m^2$ may be used.

In operation, a system according to certain embodiments involves defining one or more zones in terms of zone profiles. One or more of these zone profiles are then stored in any one or a combination of the a mobile radio terminal 20, the zone server 30, and/or network components such as the Home Location Register (HLR), Visitor Location Register (VLR), presence server or in a database used by an intelligent network. The profiles to be associated with any given mobile radio terminal may be determined based on the subscriber profile as described in detail below. In some embodiments, the zone profiles stored on the mobile radio terminal 20 are updated and managed by the mobile radio terminal 20, and/or the zone server 30. The updates may be performed periodically at a time interval that may be predetermined or may be random. Alternatively, the updates may be performed upon the occurrence of certain events as described herein. An application running on the mobile radio terminal 20 determines the zone status or statuses by measuring radio signal parameters and comparing these measurements with the zone profiles stored on the terminal 20. If a specific zone status has changed, the mobile radio terminal 20 and/or the zone server 30 may take one or more actions associated with that zone such as transmitting an SMS and/or displaying a message. Each of these steps will be described in more detail below.

A zone profile is a quantitative characterization of the radio parameters that may be measured by a mobile terminal located within the zone. A profile may consist of one or more elements relating to cells in the vicinity of the zone and to the different types of parameters that may be measured by a terminal. The elements of the profile are designed to reflect parameter values that may be observed in the zone, and optionally with some representation of the expected variation of the parameter values within the zone. For example, in the case of cell identification parameters, the profile may contain one or more cell ID values together with associated model parameters as disclosed in PCT Application PCT/AU2008/000344.

The zone profile may be derived in a variety of ways. In some embodiments, the zone server 30 may define the zones. In these embodiments, the zone server 30 may create a new zone definition with specific parameters including a unique identifier. For example, the zone server 30 may utilize a geographic location to derive a zone definition using propagation models as described below. In this case the location may be defined in terms of, for example, geographic coordinates in a shared reference frame or a civic address. Instead of, or in addition to, a zone derived using radio propagation modeling, a zone may be derived from one or more radio parameter measurements made from within the zone as described below. In these instances, the zone server 30 may include in a provisioning request the details of a mobile terminal that will provide the measurements from which the zone definition may be derived.

In certain embodiments the zone server 30 may establish associations between a zone and one or more subscribers identified by a suitable identifier, such as an MSISDN or IMSI or other identifier that would enable the zone server to distinguish the subscriber(s). The zone server could establish the associations, and where appropriate, transmit the zone definition to the zone provisioning and monitoring application on the mobile terminal(s). The decision as to whether to transmit a zone definition to a subscriber terminal is based on one or more decision criteria as described below. For each zone defined the process is repeated.

In some embodiments, the profile is derived in part or in whole from measurements made by a mobile radio terminal 20 from within the zone. These measurements may include, for example, Wi-Fi access point Media Access Control (MAC) addresses, cell identifiers, channel frequencies, other identification codes such as base station identity codes or scrambling codes, timings including round trip timings or time differences, signal level measurements including Received Signal Strength Indication (RSSI) or Received Signal Code Power (RSCP) or any combination thereof. The measurement process involves performing one or more measurement cycles while the terminal is within the zone. In each measurement cycle the required zone profile measurements are recorded. In one form of this embodiment, the measurements are made repeatedly at a configurable rate (also called the measurement period). In some embodiments, the measurement cycles may range from 1 second to 10 seconds, 5 seconds to 15 seconds, 10 seconds to 50 seconds, 30 seconds to 3 minutes, 1 minute to 5 minutes, or 2 minutes to 20 minutes. Furthermore, the measurements may also be collected one at a time, at representative points by selecting a menu item to trigger the addition of a new measurement. Between 1 and 5 measurements, between 2 and 8 measurements, between 3 and 10 measurements, between 5 and 20 measurements, between 10 and 50 measurements, or between 25 and 100 measurements may be required to adequately characterize the zone. For larger zones between 1 and 5 measurements, between 3 and 8 measurements, between 5 and 20 measurements, between 10 and 50 measurements, between 25 and 100, between 50 and 250 measurements, between 200 and 1000 measurements, or between 500 and 5000 measurements may be required to adequately characterize the zone. In some embodiments, it may not be necessary to limit the time or the number of measurements made during the zone initialization. In these situations, the person taking the measurements may determine the duration of measuring and the number measurements to be made. A menu entry may be provided on the terminal for example, to conclude the measurement phase. Combinations of various ways to collect measurements could also be utilized.

Once the measurements are taken from within the zone, they are processed to generate a zone profile. When processing is described as being carried out in a mobile terminal, it will be understood that the processing could be carried out in the handset, in the Subscriber Identification Module (SIM) that is inserted in the handset, in an additional processing or smart card inserted into the handset, or in a combination of these. It will also be understood that much of the processing that occurs in the implementation of various aspects of the present invention can also be distributed between the handset, one or more network elements within the radio communications network and/or one or more elements outside the radio communications network. For example, measurements could be taken by the mobile radio terminal 20 and then some or all of the measurements could be transmitted to the zone server 30 for processing. Additionally, the measurements could be partially processed in the server 30, and then transmitted to an external processor 40 for complete or further processing. The results of the processing could then be sent to the network server 30 and/or mobile radio terminal 20. In certain embodiments, the external processor 40 may be a third party system or may be part of the service provider's system. Any other combination of data transmission paths could be used.

The types of measurements available may vary depending on the application, the measurement capabilities of the mobile terminal as well as the type of radio network and the bearer used to carry the data. For instance in a GSM network, where a SIM card is used to host the mobile terminal component of the system, the measurements may include serving cell identifiers, Absolute Radio Frequency Channel Numbers (ARFCNs), Base Station Identity Codes (BSICs) and received signal levels, or combinations thereof. In another example, where the network is a UMTS network, the measurements may include one or more serving cell identifiers, one or more pilot channel (CPICH) signal level (RSCP) measurements, one or more Round Trip Time (RTT) measurements and one or more time difference measurements (SFN-SFN offsets), or combinations thereof. In yet another example, where the network is a CDMA network, the measurements might include one or more base station IDs, one or more pilot channel (PICH) received levels, one or more PN offsets and one or more round trip delays, or combinations thereof. In one aspect, the measurements that may be obtained include the identity of the serving cell. In an alternative aspect, the measurements may include received signal power (RxLev) for mobile radio terminals.

Some measurements are only available when the mobile has an established connection with the network. An example of such a measurement is Timing Advance in GSM networks. Additional measurements of this type can improve the accuracy of the location calculation. Some applications might have higher quality of service (QoS) or accuracy requirements. To satisfy such application requirements, the mobile may initiate a connection with the network, gather one or more timing measurements and then close the connection. This additional step would be performed in situations where a recent timing measurement is not available and the QoS requirements necessitate such a measurement. The connection may be a voice, data, GPRS, other type of connection, or combinations thereof, that enables a timing advance measurement to be obtained. The one or more timing measurements are then incorporated with the other measurements used for zone determination.

In certain embodiments, the measurements made by the mobile 20 are limited in duration to a certain time period. This time period will range from 1 second to 10 seconds, 5 seconds to 15 seconds, 10 seconds to 50 seconds, 30 seconds to 3 minutes, 1 minute to 5 minutes, or 2 minutes to 20 minutes. The system may permit a user to roam around in the desired zone for this period during which measurements are collected. Advantageously, in certain embodiments it may be desirable to limit the duration of the measurement period and in this way the user is discouraged from making measurements beyond the approximate intended extent of the zone.

For large zones, the specified duration may allow the user a larger window of time in which to collect measurements at sample points in the desired zone. The duration may also be varied by the network operator based on different service offerings associated with different sized zones, having different pricing levels or structures. The desired zone sizes may vary depending on the application or service. For instance in some zone applications, a zone size of between 2.5 $m^2$ and 20 $m^2$, between 5 $m^2$ and 20 $m^2$, between 10 $m^2$ and 30 $m^2$, between 20 $m^2$ and 50 $m^2$, between 40 $m^2$ and 250 $m^2$, between 100 $m^2$ and 500 $m^2$, between 300 $m^2$ and 2000 $m^2$, or between 1000 $m^2$ and 5000 $m^2$ or any combination of these ranges may be suitable. In this case for example, a duration between 5 s and 20 s, between 10 s and 30 s, between 20 s and 2 minutes, between 1 minute and 5 minutes, between 3 minutes and 15 minutes, between 10 minutes and 1 hour or any combination of these ranges may be sufficient to gather the measurements. In another service targeted to larger commercial enterprises or properties, a larger zone size may be suitable, for example between 10 $m^2$ and 35 $m^2$, between 25 $m^2$ and 75 $m^2$, between 40 $m^2$ and 200 $m^2$, between 100 $m^2$ and 800 $m^2$, between 500 $m^2$ and 5000 $m^2$, or between 2000 $m^2$ and 25000 $m^2$ or any combination of these ranges. In this example, suitable measurement time intervals may range from about 10 s to 50 s, from 30 s to 3 min, from 1 min to 5 min, from 2 min to 30 min, from 10 min to 2 hours, or from 1 hour to 4 hours or any combination of these ranges.

In some applications, an account representative of the network operator may be responsible for collecting the measurements that define the zone using the mobile radio terminal 20. In these cases the embodiment provides an alternative mode of operation whereby the account manager has the ability to control, or partially control, the duration of the zone definition measurements. Furthermore, the measurements may also be collected one at a time, at representative points by selecting a menu item to trigger the addition of a new measurement. Depending on the size of the area to be included within the zone between 5 and 20 measurements or between 10 and 50 measurements or between 25 and 100 or between 60 and 500 or between 250 and 1000 or between 500 and 2500 measurements may be required to adequately characterize the zone. For larger zones perhaps comprising multiple buildings, larger numbers of measurements may be needed. For instance between 50 and 250 measurements or between 200 and 1000 measurements or between 500 and 5000 or between 2000 and 10000 measurements. In some applications, it may not be necessary to limit the time or the number of measurements made during the zone initialization. In this case, it may be at the user's discretion as to how long or how many measurements are made. A menu entry may be provided on the terminal for example, to conclude the measurement phase.

In certain embodiments, Base Station Identification (BASE_ID) and optionally Pilot Power (Ec/I0) may be measured in a CDMA (IS95) network for example. As with GSM and UMTS networks, a series of measurements may be recorded from within the zone. The measurements may correspond to any combination of the members of the active set, the candidate set, the neighboring set and the remaining set of cells maintained by the mobile terminal. In a CDMA network, the mobile terminal divides searching into three windows: SEARCH_WIN_A, SEARCH_WIN_N and SEARCH_WIN_R to gather information to support the handover process. In these windows, the mobile terminal gathers information about these four types of cells which collectively include all cells in the network.

In certain embodiments, the server may optionally conduct a zone alignment check as described in more detail below to ensure that the measurements are valid. If the check is done, and the measurements are deemed to be valid, the system will proceed to generate the profile. If the measurements are deemed to be invalid (i.e., inconsistent with the zone location), then the registration request will be denied.

In certain embodiments, the profile may be generated entirely, or partially, by radio network propagation modeling, such propagation modeling being well known in the art. The model uses information on the configuration of the radio network including, but not limited to, one or more of the following: the location of cell sites, the height and orientation of cell antennas, the radiation pattern of the antennas as well as the channel frequencies and any other codes allocated to each cell. The model also covers the loss in signal power as radio signals travel from transmitter to receiver. Such models are well known in the radio communications field. Predicted received signal powers can be generated for any or all cells in the network. These power levels can also be used to derive interference level estimates so that the received quality of a signal from any particular cell can be predicted. The application of network model for predicting received signal levels and interference levels is well known. Detailed references exist in the literature including, Mobile Communications Engineering. McGraw-Hill, 1982, and "Evaluation of positioning measurement systems" T1P1.5/97-110, December 1997, and IEEE VTS committee, "Coverage prediction for mobile radio systems operating in the 800/900 MHz frequency range," IEEE Transactions on VTC, Vol. 37, No 1, February 1998.

In certain embodiments where the zone is expected to service a certain location, the location may be specified as the latitude and/or longitude of that address. Alternatively the location may be specified as the civic address of the location and a lookup performed on a lookup table to translate this into the same coordinate frame in which the network cell site locations are defined. The predicted received signal levels for all cells, as received in the zone are compared and a detect ability criterion applied to select those cells that are likely to be measured and reported by a mobile terminal. Typically the detectability criterion would be a predicted carrier to interference (including noise) value greater than a threshold. For example in a GSM network, a C/(I+N) threshold of +9 dB could be applied. For a UMTS network, the equivalent threshold could be a CPICH Ec/N0 level of −20 dB. Other threshold values depending on the network and application may range from about −26 dB to about +15 dB, (for example, −26 dB to −12 dB, −22 dB to −6 dB, −20 dB to −12 dB, −15 dB to 0 dB, −12 dB to +3 dB, −6 dB to +12 dB, −3 dB to +15 dB and +3 dB to +15 dB etc.).

Alternative criteria such as comparing predicted power levels against a threshold or selecting a number of the strongest predicted cells could also be employed. The present embodiment illustrates a feature of this invention, which is to serve as a translator for zone definitions. It is often convenient for operators and users of zone services to conceive of zone locations and extents in spatial terms, most commonly in terms of a geographic coordinate frame or alternatively in spatial terms with reference to some landmark, perhaps a street address. The radio parameter measurements which actually serve to define the zone span an entirely different dimension however. Certain embodiments provide a translation facility between the terms in which operators and users describe a zone and the actual radio parameter measurements needed to operate such a zone. In less precise zone systems where for instance the zone is defined simply in terms of the serving cells, this translation although necessary, may not be complex and therefore can be done mentally or by hand if the locations of the cell sites in the vicinity of the zone are known. For precise zone definitions however, where additional radio parameter measurements must be used to achieve the finer spatial discrimination, this translation process may become more complex.

If additional information on the network configuration parameters which affect the serving cell selection is available then these can be incorporated in the probability calculations as well. Such information in GSM systems may include, without limitation, BCCH Allocation lists per cell, C1 and C2 thresholds as well as penalty times. The GSM idle mode cell selection process is described in 3GPP TS 05.08. In a UMTS system, such information may include, without limitation, Qqualmeas, or Qrxlevmeas. The UE cell re-selection process is described in 3GPP TS 25.304.

An extension to the use of modeling tools can be used where real measurement data is available for the region of interest. So-called drive-test data if it has been collected in the target zone can be incorporated in the profile generation process. This drive-test data may, for example, provide accurate measurements of shadowing or other deviations in the radio propagation environment. These measurements may be used to further refine the radio propagation model.

In certain embodiments, Wi-Fi access point MAC address and RSSI may be measured. A series of such measurements may be recorded from within the zone. The measurements may correspond to any number of Access Points (APs) that can be detected by the terminal within the zone. In the case of terminals which are dual mode capable, measurements pertaining to a cellular network may also be collected to enable a degree of consistency checking due to the more permanent nature of cellular network infrastructure and cell ID assignments compared to Wi-Fi APs which may be more frequently relocated.

In certain preferred embodiments, the profile definition is generated by combining predictions from a modeling tool with measurements made by a terminal within the zone. At least one advantage of this embodiment is that if the terminal did not report any measurements of a particular nearby cell, the modeling tool predictions may indicate a sufficiently high probability that the particular cell will still be included in the profile. In addition, using only measured serving cells usually will lead to a relatively small profile containing only those cells with a significant probability of serving. The remaining neighboring cells in this case are not in the profile and as a result have to be treated equally when observed. It should be noted, however, that those cells which are closer to the zone (although not reported during the few measurement cycles) are more consistent with the terminal being in the zone than other cells a greater distance from the zone. Therefore by combining the measured values for the strongest cells with predicted values for weaker cells, greater resolution may be achieved in treating observations of other neighboring cells. This may help preserve zone stability when the terminal is within the zone. This could happen, for instance, when a terminal briefly reselects to a nearby neighboring cell that was not measured as a serving cell during the registration process.

In operation, the set of measurements may be transformed into a profile by completing unknown fields using the network database and/or network parameters and adding additional elements needed by the zone decision process. For example, the unknown cell IDs may be added by searching in the network database for the closest cell to the reported serving cell having this ARFCN and BSIC as described in more detail below when discussing ambiguous measurements. The unknown ARFCN and BSIC for the serving cell are added by looking up these parameters in the network database based on the reported cell ID.

During the profile generation process, an allowance for variation in power levels (Log Normal standard deviation, also referred to as sigma) may be added by the server for use in the zone decision process. In one embodiment, the sigma values may be set to a default value of decibels. In practice, these might be set to any value such as between 3 and 9 dB, between 6 and 15 dB, or between 12 and 25 dB depending on the application and the nature of the environment in which the zone is to be defined. Optionally, the sigma values in the profile may be set differently for different cells based, for example, on their local environment. In a dense urban area larger values would typically be used, for instance between 9 dB and 15 dB, between 12 dB and 20 dB, or between 14 dB and 25 dB. For less dispersive environments or environments with less clutter smaller values may be suitable, for instance between 3 dB and 9 dB, between 6 dB and 12 dB, or between 8 dB and 15 dB. The values may also be varied according to characteristics of the respective cells such as antenna height.

The allowance for the variation in the power levels can be adjusted to account for other variations due to effects such as multipath. One suitable representation for the received signal level is a statistical log normal distribution. Alternative models include Rayleigh and Rician distributions. These may be suitable depending on the specific application. For example, a zone associated with an indoor or mixed area may be more suitably modeled with a Rayleigh distribution since there is a lesser likelihood of a direct line of sight to the cell antenna. Conversely a zone associated with chiefly outdoor areas may be more suitably characterized with a Rician model. The expected variation may also be suitably represented by other measures such as inter-quartile range.

Many other types of measurements may be utilized for determining profiles such as timing measurements. In UMTS for instance, Round Trip Time (RTT) measurements for the cells in the active set may be utilized. In this case, reference measurements may be taken during the initialization phase. For each cell and parameter, an entry is then added to the zone profile representing a typical value for this parameter along with a value representing the expected statistical variation of this parameter within the zone. When evaluating a set of measurements against this profile, a cost is computed as illustrated for power levels above wherein the difference between the measured value of the parameter and the value in the profile is calculated and scaled by the statistical scaling parameter to obtain a cost for combining with the costs associated with the other measurements. In similar fashion other radio parameter measurements may be incorporated in the process such as time differences. Indeed any radio parameter measurement for which a typical value and a measure of its variation within the zone can be obtained may be used in similar fashion.

In some cases, the radio parameter measurements may not include a cell identifier. This may be due, for instance, to a limitation of a mobile terminal or a characteristic of the radio network. In such cases alternative identification parameters may be used, such as a Location Area Code (LAC) in the GSM network or a combination of channel frequency and other parameter such as a scrambling code.

For a system where the user is responsible for at least a part of the measurements used in defining the zone, it may be an application requirement to apply checks to ensure that the user has performed the measurements in the area nominated in the service contract. In one aspect, the present invention provides such checks by first applying the measurements to a location system to calculate an estimate of the location from where the user measurements have been made. Examples of appropriate methods of obtaining the approximate location of the mobile radio terminal 20 include those as described in co-pending patent application numbers: PCT/AU2005/001358; PCT/AU2006/000347; and PCT/AU2006/000348.

The results of this calculation can then be compared against the nominal location of the zone (based for example on a reverse geo-code of the specified street address) and if the two are within an acceptable distance of each other then the registration process proceeds. What constitutes an acceptable distance may vary from network to network and from application to application. As an example, a threshold on the order of the average local cell site separation may be suitable. Otherwise the registration may be rejected or other steps initiated, requiring the user to repeat the registration. In the case of an advertising zone, offered to a retailer in a particular retail complex, and in which the advertiser will perform the registration, the location validation may employ a threshold which encompasses the entire complex but which is small enough to discriminate between this complex and the next nearest retail complex.

Once the profiles have been defined, they are then stored in any one or a combination of the mobile radio terminal 20, the zone server 30, and/or radio network components such as the HLR/VLR. If the profiles are generated by the mobile radio terminal 20, they may be transmitted to the zone server 30 and/or radio network components via any suitable radio network transmission medium such as Short Message Service (SMS), Multimedia Message Service (MMS), General Packet Radio Service (GPRS), Unstructured Supplementary Service Data (USSD), High-Speed Circuit-Switched Data (HSCSD), High-Speed Packet Access (HSPA) or High-Rate Packet Data (HRPD). Likewise, if the profiles are generated by the zone server 30, they may be transmitted to the mobile radio terminal 20 via any suitable radio network transmission medium such as any of the above and/or Wireless Application Protocol (WAP) Push.

Figure 2:
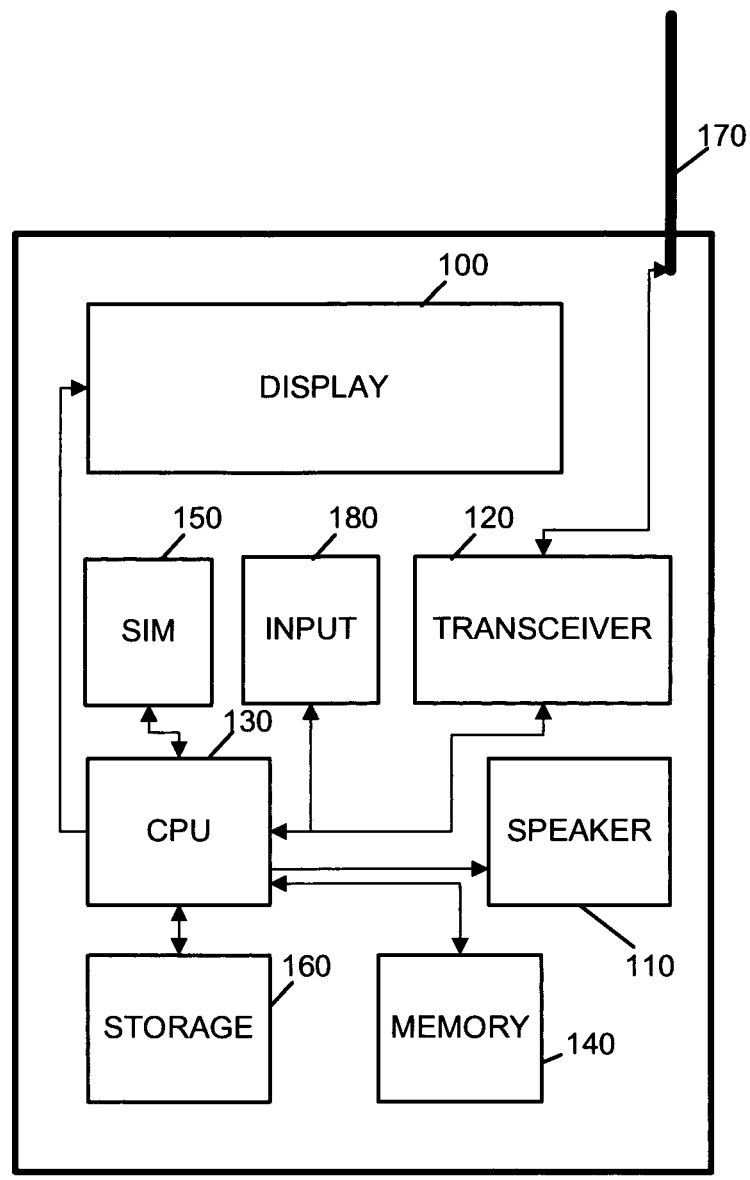
FIG. 2 illustrates an exemplary mobile radio terminal in accordance with certain embodiments.

FIG. 2 shows an exemplary GSM mobile terminal 20 according to an exemplary embodiment illustrating necessary components to perform the procedures relating to certain of the systems disclosed herein. The mobile radio terminal 20 may be any type of handset or PDA and may operate over any radio communications network such as GSM, UMTS, or CDMA. The mobile terminal 20 has a display 100 that allows the user to visually read information and may allow the user to view multimedia information such as video. The mobile terminal 20 may also provide voice or sound output through an optional speaker 110. The Mobile terminal 20 may further comprise a network transceiver 120 to receive transmissions from and to transmit requests to network 10, a central processing unit (CPU) 130 for controlling and executing all necessary procedures, a memory (e.g., SDRAM) 140, a Subscriber Identity Module (SIM) card 150, a data storage unit 160, an antenna 170, and one or more inputs 180 for inputting information into mobile terminal 20. In certain embodiments, CDMA handsets may include a Removable User Identity Module (R-UIM) and UMTS handsets may include a Universal Subscriber Identity Module (USIM). The data storage unit 160 can be, for example, a hard disk magnetic or optical storage unit, as well as a CD-ROM drive or a flash memory such as Secure Digital, MultiMediaCard or CompactFlash card. Input 170 may be, for example, a numeric keypad, a keyboard, a software keyboard touch screen, a touch screen (in combination with the display 100), a mouse, a pointing device such as pointing pen, etc.

The SIM card is a specific instance of a smart card or security/trust token for secure wireless communication networks, i.e., in this instance for the GSM network. Other representative examples of smart cards for secure wireless communication networks include the Universal Identity Module (UIM), the Removable User Identity Module (R-UIM), and the UMTS Subscriber Identity Module (USIM). The SIM represents the subscription contract between a specific subscriber (network user) and the GSM network operator, i.e., providing the means for authenticating the subscriber for network access and identifying GSM network services to which the subscriber is entitled, i.e., the SIM card is the subscriber's identity in the context of the GSM network. The SIM card is portable to any GSM terminal, thereby providing the subscriber with an unprecedented degree of personal mobility.

The SIM card is in fact a small computer, containing a standardized operating system (JavaCard™ is implemented in the SIM card; Smart Card for Windows and Multos™ are other standardized operating systems for smart cards) and system files, RAM and flash memory (for storage of data and applications), a microprocessor, and typically a cryptographic co-processor. The GSM network operator controls the distribution and the stored content, e.g., data, applications, of the SIM card. Content on the SIM card may be provisioned by one or more of the network operator, the handset manufacturer, the SIM card manufacturer, or the subscribers themselves (via, for example, WAP Push, or direct USB download). Stored on SIM cards configured for GSM networks are subscription and security-related data, e.g., a subscriber number (International Mobile Subscriber Identity (IMSI)) that uniquely identifies the subscriber, a network operator-assigned subscriber-specific call number (MSISDN), i.e., the subscriber's 'phone number' in the GSM network, the subscriber key and cryptographic algorithms for authentication of the subscriber and encryption of subscriber communications (specified by the GSM network operator), and subscriber personal data, e.g., the subscriber's password or personal identity number (PIN) for accessing the SIM card, personal telephone directory, call charging information, a log of recently-dialed numbers, short text messages (for use with SMS (Short Message Service)), and a personalized subscriber services portfolio, i.e., applications.

Also embedded in the SIM card is a SIM Application Toolkit (STK). The STK provides the functional capability, inter alia, to allow the subscriber to access and use embedded applications via the user interface of the GSM terminal, and to modify the menu structure of the GSM terminal in conjunction with the use of such applications. The STK also allows the GSM network operator to download new data and/or applications to the SIM card to implement new services for the subscriber.

Because different mobile radio terminals may have different capabilities, the zone provisioning and monitoring application may determine which type or types of zone definition are appropriate for each subscriber's terminal by performing capability tests on the terminal. These capability tests could determine that radio terminal's operating capabilities, e.g., video display size, memory size, processor speed, network capabilities (GSM, CDMA, and or Wi-Fi), as well as the terminal's capability to measure NMRs and/or CellID. These tests may be performed when the application is first activated (e.g., installed for the first time on a Symbian enabled handset), when the terminal is changed (e.g., in a SIM based application), and/or if the server 30 sends a message to the terminal directing it to perform the tests, or combinations thereof. This capability data could be used, for example to provision only 2G compatible zone profiles to 2G terminals, or may provision 3G zone profiles to dual mode 2G/3G compatible terminals where there is 3G network coverage. Additionally, the system may provision Wi-Fi zone profiles for Wi-Fi capable terminals. However, in cases of Wi-Fi zone profiles, there may be issues due to Wi-Fi network changeability which arise from the fact that the location of access points and associated IDs are not controlled in any coordinated fashion. This may be addressed by having dual mode (e.g., Wi-Fi and 2G cellular capable) devices periodically report measurements from both networks so that the terminal can correlate the Wi-Fi measurements with cellular network measurements. Attributes of a subscriber's terminal can also be taken into account in choosing associations between zones and subscribers.

The zone profiles may be stored in any combination of the SIM, R-UIM, USIM, internal memory, removable memory card, additional processors and/or a smart card inserted in the handset. For example, the zone profiles may be stored on a Java Card based SIM card in zone definition slots. The zone provisioning and monitoring application may also be stored in any combination of the SIM, R-UIM, USIM, internal memory, removable memory card, additional processors and/or a smart card inserted in the handset. For example, the zone provisioning and monitoring application could be a SIM Toolkit Java Card applet that is also stored on the SIM card. Other suitable runtime environments could include the Series 60 platform, Binary Runtime Environment for Wireless (BREW) platform, and Java Platform, Micro Edition (Java ME). The zone provisioning and monitoring application may execute in any combination of the processor, the SIM, USIM or R-UIM on the handset, an additional processor, internal memory, and/or a smart card inserted in the handset.

The zone server 30 may be, for example, a GNU/Linux or Apache server running on a blade server or server farm. The zone server 30 may also be a distributed network of servers. The server 30 is not limited to the physical hardware, but may also include the software. The server 30 may use any suitable database for storing the zone profiles. For example, the server 30 may store the zone profiles in one or a combination of a MySQL, MS SQL Server, MS Access, Oracle DB, and/or Apache Derby database.

The server 30 may be connected to the radio communications network 10 or coupled to an external IP network such as an IPv6 network, that may be connected to the radio communications network via, for example, a GSM Gateway GPRS Support Node (GGSN) or a CDMA2000 Packet Data Serving Node (PDSN). The server may also share processing responsibilities with an external processor 40. The external processor may be any type of computing platform such as another server, a mainframe, or a distributed computing network.

The zone server 30 may communicate with the mobile radio terminal 20 using any radio network data service such as Short Message Service (SMS), Unstructured Supplemental Service Data (USSD), Personal Instant Messaging (PIM), Wireless Application Protocol (WAP), and/or Multimedia Messaging Service (MMS) via any suitable medium such as General Packet Radio Service (GPRS), Enhanced GPRS (EGPRS), High Rate Packet Data (HRPD), and/or High Speed Packet Access (HSPA). For security purposes, messages may be encrypted and/or authenticated using an encryption layer such as, for example, Secure Sockets Layer (SSL), or Transport Layer Security (TLS). While TLS typically only provides for server authentication, in some embodiments, mutual authentication of both the server 30 and the mobile terminal 20 may be desired. In these embodiments, public or private key infrastructure (PKI) deployments may be utilized incorporating one or more of, for example, RSA, Diffie-Hellman, and/or DSA encryption algorithms. Advantageously, encryption and mutual authentication may provide security against security violations such as spoofing or man-in-the-middle attacks.

Once a zone profile has been successfully provisioned on the mobile radio terminal 20, the mobile radio terminal 20 may commence monitoring to determine whether it is within the defined zone. The mobile radio terminal 20 may take measurements from time to time. Additionally, the mobile radio terminal 20 may take measurements when triggered by a message from the server 30. In another embodiment, the mobile radio terminal may take measurements when triggered by a user action, such as initiating a call or upon user command.

Once measurements have been obtained by the mobile radio terminal 20, they may be stored in a measurement accumulator at the mobile terminal. The accumulation of measurement sets may be performed for any suitable time period such as for 60 seconds to 5 minutes, for 5 minutes to 10 minutes, for 10 minutes to 30 minutes, for 30 minutes to on hour, for one hour to 24 hours, or for a greater period of time. However, to implement an accumulator on a mobile terminal, the accumulator application must operate within constrained resources, for instance the memory and CPU cycles available for operating the accumulator.

Some of the measurements taken by the mobile terminal may exhibit measurement ambiguity. Measurement ambiguity refers to the lack of a unique identifier for some of the measurements. In some cases, multiple measurements having the same non-unique identifier do not necessarily derive from the same base station. As an example, the Network Measurement Report (NMR) from a GSM terminal contains at most information pertaining to one serving cell and six neighboring cells. Repeated measurements over a short period may exhibit some diversity due to the variations in radio propagation such as fading and non-stationary interference. This means that compared to calculating a location estimate using any single measurement set, it is frequently possible to obtain a more accurate estimate by instead accumulating the results of several successive measurement sets and combining these in some fashion to perform a zone determination. It should be noted that this improvement is likely to be more pronounced than the gain achieved simply reporting an average of multiple noisy observations of the same parameter.

A GSM NMR illustrates the existence of ambiguous measurements. The neighbor cells are commonly identified only by their frequency (ARFCN) and base station identity code (BSIC) or just the frequency. Unlike the cell identity, these are not guaranteed to be unique across the network. Determining an accurate location estimate requires that the ambiguous measurements be associated with the correct base station and that measurements from different base stations are not inadvertently mixed together such as by averaging. While this example illustrates a particular form of the present invention in which GSM cell ID, signal level and round trip timings are represented in a measurement accumulator this should not be interpreted as a limitation of the invention. It will be clear to one of ordinary skill in the art how other types of measurements such as CDMA (IS95) pilot levels and PN offsets might be accumulated in similar fashion.

The accumulator maintains one table holding the identities of cells that are measured and one table holding the measurements pertaining to those cells. Each time a new measurement cycle is completed, these tables are updated. If a measurement pertaining to a new cell is received, the cell table is updated with the new cell identifiers. Since the size of the tables may be limited in certain embodiments (subject to memory and CPU cycle limits), it may be necessary to purge an existing entry from this table before adding the new cell. This purging of the tables may be performed, for example, on a relative value basis, taking into account the relative value of the existing measurements associated with each of the cells in terms of a location calculation. The value of a cell in the cell table is calculated as the sum of the values of the individual entries in the measurement table which are associated with that cell. The value of individual measurements are calculated, taking into account the relative age, the type of measurement, the confidence associated with the match to the corresponding cell table entry and also the presence of any more recent similar measurements.

The least valuable cell may be purged in order to optimize the value of the accumulated information at any given time. The measurement details are added to the measurement table, again after purging the least valuable existing measurement as required. For detailed examples of the operation of the accumulator in a mobile radio terminal, see PCT/AU2006/000479.

Once the mobile radio terminal 20 obtains the measurements, it may then use an algorithm to make an initial determination of whether or not it is in the defined zone. In alternative embodiments, the algorithm may determine whether the mobile radio terminal is within a certain distance of the boundaries of the defined zone. For example, the algorithm may determine whether the mobile radio terminal is within about 10 m to 1000 m of the defined zone. In one embodiment, the algorithm makes a decision as to whether the mobile is in or near the zone by calculating a cost, and comparing this cost with a threshold. The cost is a quantitative representation of the difference between the measurements and the zone profile, calculated using a cost or penalty function. For example, the total cost, C, is equal to $$C = C_m + C_{um} + C_{ur} \text{ where}$$

$C_m$=Cost associated with cells that are observed and are matched in the profile $C_{um}$=Cost associated with cells that are observed but are not matched in the profile $C_{ur}$=Cost associated with cells that are in the profile but are not reported In this example, cells are uniquely renumbered such that cells 1 to $N_m$ are associated with cost $C_m$, cells $N_m+1$ to $N_m+N_{um}$ are associated with cost $C_{um}$, and $N_m+N_{um}+1$ to $N_m+N_{um}+N_{ur}$ are associated with $C_{ur}$, where $N_m$=Number of observations that are matched in the profile, $N_{um}$=Number of observations that are not matched in the profile, $N_{ur}$=Number of cells that are in the profile but are not reported, Each of the costs is then calculated in the following manner:

$$C_m = \sum_{i=1}^{N_m} \frac{(r_{Pi} - r_{Oi})^2}{2\sigma^2}$$

$$C_{um} = \sum_{i=N_m+1}^{N_m+N_{um}} \frac{(r_{Pi} - t_{um})^2}{2\sigma^2}$$

$$C_{ur} = -\sum_{i=N_m+N_{um}+1}^{N_m+N_{um}+N_{ur}} \log\left[\frac{1}{2}\left(1 + \text{erf}\left(\frac{t_{ur} - r_{Pi}}{\sqrt{2}\,\sigma}\right)\right)\right]$$

where $r_{pi}$—The expected value of the signal strength (dBm) of the ith cell, as entered into the profile, $r_{Oi}$—The observed value the signal strength (dBm) of the ith cell, $t_{um}$=a fixed value (in dBm) that represents the value of signal strength such that it is unlikely that a cell will be not be observed in the profile if the cell's expected signal strength is above $t_{um}$, $t_{ur}$=a fixed threshold (in dBm), as described in PCT/AU2006/000347.

$\sigma$=scaling parameter, and erf=the standard error function.

The decision as to whether the mobile is in the zone is made as follows

If $C < \chi 2(x, N_T-2)$ then in the zone;

Else not in the zone.

where $\chi 2$ is the standard statistical function, $N_T=N_m+N_{um}+N_{ur}$ x=a percentage between 0 and 100, which represents the degree of consistency between the measurements and being in the zone.

In a GSM system, experimentation and simulations indicate that suitable values for the unmatched cost threshold lie between, for example, −80 dBm and −95 dBm, between −85 dBm and −100 dBm, or between −90 dBm and −105 dBm. Similarly, suitable values for the percentage may lie between, for example, 50% and 70%, 65% and 85%, or 75% and 100%.

The value of $\sigma$ may depend on several factors including the radio environment, and may range from about 3 dB to about 24 dB (e.g., about 3 dB to 9 dB, 6 dB to 15 dB, 9 dB to 20 dB, or 13 dB to 24 dB). One method of calculating the value of $t_{ur}$ is as described in PCT/AU2006/000347. In GSM, the signal strengths may be quantized to about 1 dB.

The mobile radio terminal may observe the signal levels, timing advance, time differences, or other parameters as described above. In addition, the fact that a particular cell is not reported may also be an observation. It should also be noted that a variety of approximations may be applied to reduce the computation load associated with these calculations especially in mobile terminals. Examples include a lookup table approximation to the error function and the Chi-Squared distribution. See PCT/AU2006/000478 for an example of the zone determination process.

The mobile radio terminal 20 may transmit the results of its zone determination from time to time to the server 30. In one embodiment, a notification message may be triggered by the mobile upon determining that it has moved into or out of a defined zone. Advantageously, transmitting the information only on a change of status yields low signaling rate which in turn minimizes battery drain in the subscriber's terminal. In another embodiment, this transmission may be initiated by a message from the server.

Other events may be used to trigger the transmission of the zone status message to the network. For example, the transmission could be triggered by the subscriber initiating a call, thereby sending the information when it is required to determine the zone status for rating a call. The act of unlocking the mobile terminal keypad by the subscriber might also be used as a suitable trigger for this transmission. Alternatively the transmission could also be triggered by the subscriber from a menu item on the terminal.

When the server receives a zone status message from a mobile terminal, it may process the included measurements and re-evaluate the zone status change according to the methods described above. Advantageously this may provide independent server-side verification of the zone determination. This is also beneficial because the server may have access to additional information or algorithms not available at the mobile.

Figure 3:
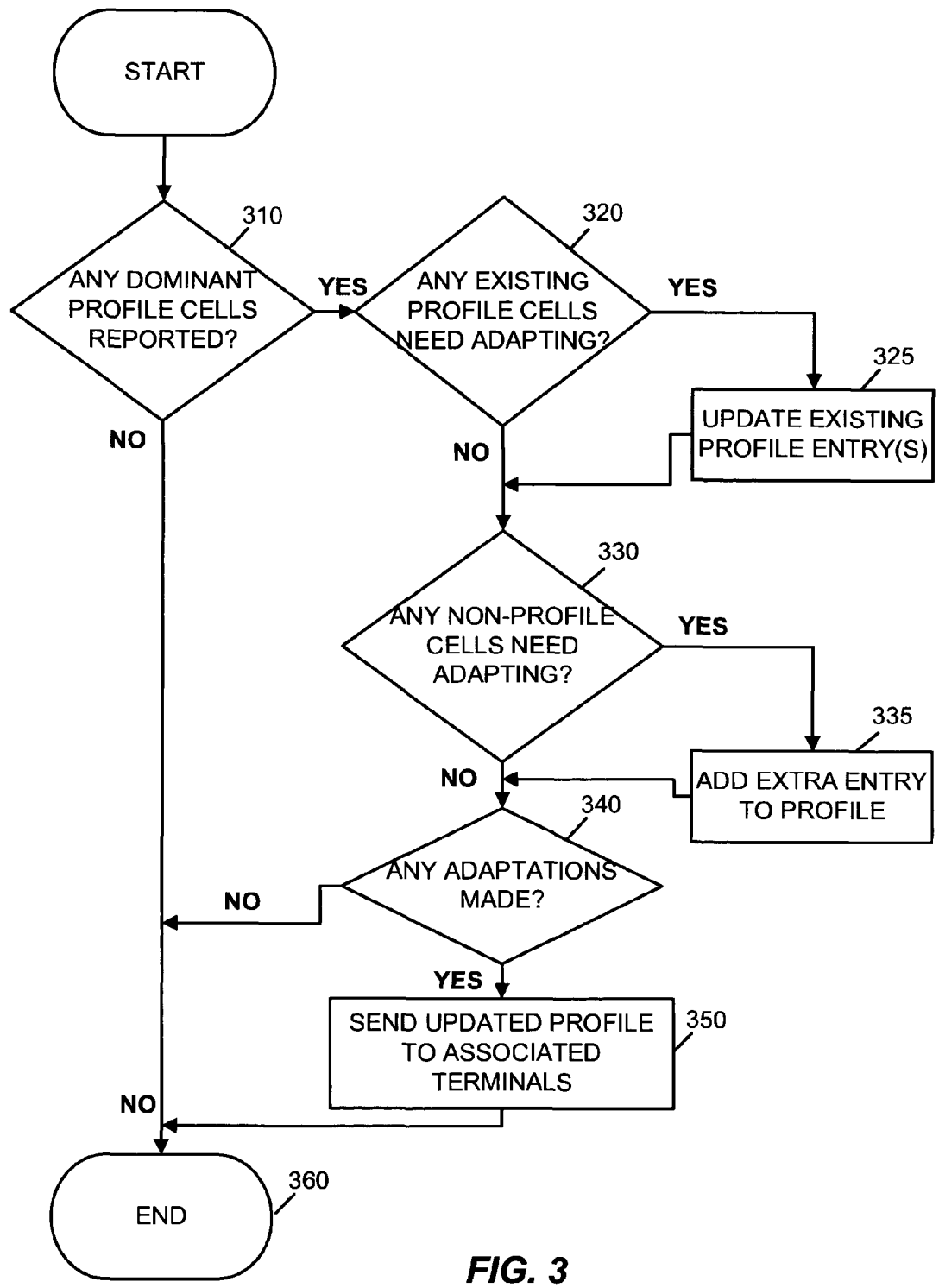
FIG. 3 illustrates an exemplary process flowchart of an adaptation process in accordance with certain embodiments.

FIG. 3 illustrates the adaptation processing flow in accordance with certain embodiments. This adaptation may be triggered anytime there is a sequence of radio measurements available. In some aspects, the determination of whether adaptation should be performed may occur in the zone server or the mobile radio terminal or distributed between them in any suitable manner. Such a determination may be made for example: periodically using a set time interval (e.g., every 10 seconds, every minute, every 10 minutes, every 15 minutes, every 30 minutes, every 45 minutes, every hour, every 2 hours, every 4 hours, every 8 hours, every 10 hours, every 12 hours, or every 24 hours); at a random time interval; by the server upon receiving a set of radio measurements, for instance accompanying a zone status change (e.g., may include current filter contents and/or historical measurements); by the mobile radio terminal upon updating the measurement filter; upon collection and storage of a suitable number of measurements (e.g. a certain number of measurements such as about 10, 20, 30, 40, 50, 60, 70, 80, 90, or 100, or when the measurement accumulator nears or reaches full capacity); or at any other suitable time.

First (step 310) the system checks whether there were any dominant profile elements reported. Dominant elements are those elements most likely to be detected whilst within the zone. Depending on the circumstances, in any set of measurements there may only be a single dominant element, or there may be a plurality of dominant elements. A dominant element may be any element of a zone profile as described above, for example representing a GSM cell, a femto cell, or a Wi-Fi access point. Dominance may be defined in terms of the parameters of the element (e.g., probability, round trip delay, signal level, or combinations thereof) relative to a suitable threshold. For example, in certain embodiments wherein the profile defines a zone for a GSM terminal, an element may be dominant if its associated serving probability is greater than or equal to about 10%. In other embodiments, any suitable value for the threshold may be used, such as greater than about 1%, greater than about 2%, greater than about 5%, greater than about 7%, greater than about 15%, greater than about 20%, greater than about 25%, greater than about 30%, greater than about 35%, greater than about 40%, greater than about 50%, greater than about 60%, greater than about 70%, greater than about 80%, or greater than about 90%. In an alternative embodiment in which round trip delay measurements are utilized, an element may be defined as dominant if the associated mean round trip delay corresponds to any suitable distance such as less than about 10, 50, 200, 500, 1000, 1100, or 1200 meters, as well as between about 10 to 200, 50 to 150, 100 to 550, 250 to 1200, or 500 to 1200 meters.

The threshold for determining whether an element is dominant may be determined in various ways. In some embodiments, the threshold may be determined experimentally during implementation. For example, repeated experiments utilizing varying thresholds could be performed to optimize the threshold. In other embodiments, the threshold could be determined based on modeling and/or simulations. In other embodiments, it could be chosen based on system performance and/or cost considerations. In still other embodiments, it could be chosen in any suitable manner.

It is important to note that different elements may have different dominant element thresholds. For example, the dominant element threshold for a cell ID probability may be different from that of a RxLev signal measurement. In certain embodiments, dominance may be defined based on relative ordering of the profile elements by decreasing priority. For example, the strongest three elements could be defined as dominant. Any suitable number of the strongest elements may be used such as the top 1 element, the top 2 elements, the top 4 elements, or the top 5 elements.

The measurement cycles considered by the system may include one or a combination of the following:
1) a certain number of past measurement cycles (e.g., the previous 10, 20, 30, or 40 measurement cycles);
2) all or a subset of the measurement cycles taken in a certain time period (e.g., all measurements taken since the previous zone status change, all the measurements taken in the last 30 seconds, the last minute, the last hour, a window consisting of, for example, a window consisting of all the measurements taken from between one hour and two hours ago;
3) all or a subset of the measurements currently accumulated in the mobile radio terminal's memory as described above; and/or
4) the most recent measurements that can be encoded in a fixed data size, for instance 140 octets in a binary SMS, less any header information If a dominant element was reported in any of the considered measurement cycles, the processing continues to the next steps. These steps (steps 320 and step 330) involve checking whether there are any candidate elements in the considered measurement cycles, in the same or adjacent measurement cycles to the dominant elements. In the case of an NMR measurement set, one or more dominant elements and one or more candidate elements may be reported in the same measurement set. Candidate elements may be either existing elements within the profile that have a low priority (e.g., they have a relatively low probability of occurrence such as a low probability, low log probability or low expected RxLev) or they may be elements that are not currently represented within the profile. The candidate elements may be defined in terms of elements that have a property (e.g., probability or signal level) below a certain threshold or in terms of another radio parameter currently encoded in the profile. In certain embodiments, operating with GSM/UMTS terminals which in idle mode report only serving cell identification information, a weak candidate may be one that has a probability value below the threshold required for an IN-ZONE status determination, or one that has a −log probability above the threshold required for an IN-ZONE status determination. See PCT/AU2008/000344.

The threshold for determining whether an element is a candidate element may be determined in various ways. In some embodiments, the threshold may be determined experimentally during implementation. For example, repeated experiments utilizing varying thresholds could be performed to optimize the threshold. In other embodiments, the threshold could be determined based on modeling and/or simulations. In other embodiments, it could be chosen based on system performance and/or cost considerations. In still other embodiments, it could be chosen in any suitable manner. In certain aspects of implementation, different elements may have different thresholds. For example, the threshold for a cell ID probability may be different from that for a RxLev signal measurement. In alternative embodiments, candidate elements may be defined based on relative ordering of the profile elements. For example, the weakest three elements could be defined as candidate elements. Any suitable number of the elements could be used such as the bottom 1 element, the bottom 2 elements, the bottom 4 elements, or the bottom 5 elements.

FIG. 3, illustrates an exemplary embodiment in which the existing candidate cells in a profile are analyzed (step 320), and any existing profiles that require adaptation are updated (step 325). Then any candidate cells that are not in the profile (i.e., non-profile cells) are analyzed (step 330) and extra entries are added to the corresponding profile (step 335) as required. In alternative embodiments, the non-profile candidate elements may be analyzed before the existing profile elements. Moreover, in certain embodiments the analysis of the non-profile and/or existing elements may be omitted.

The determination of whether adaptation is required may be based on the series of measurements and/or on mobile radio terminal location indications external to the series of measurements. The series of measurements can be used to determine if the mobile radio terminal is close enough to the zone (i.e. in the vicinity of the zone) by analyzing the temporal proximity of the measurements of the dominant and candidate elements, and by analyzing the stability of the measurements of the dominant and candidate elements. In certain embodiments described herein, "close enough" may be defined as close enough to warrant zone profile adaptation and includes mobile radio terminals both within a certain distance of the zone and actually within the zone.

In certain embodiments, measurements may be analyzed for what could be termed the "stability" and "temporal proximity" of the measurements. "Stability" could be described as the number of consecutive measurement cycles that contain a dominant element or the same candidate element. This may be a useful analysis because larger numbers of consecutive measurements of a dominant cell indicate a greater likelihood of proximity to the zone. In some cases a single measurement of a dominant cell may not necessarily indicate proximity to the zone because of the nature of radio signal propagation— i.e. a single measurement could be a random reselection to a dominant cell from far outside the zone. Two consecutive measurements, however, would indicate a greater likelihood of proximity to the zone. It follows that larger numbers of consecutive measurements of a dominant cell correspond to greater likelihoods of proximity to the zone. It should also be noted that three consecutive measurement cycles, with one cycle on each of three different dominant cells, could create the same likelihood of proximity to the zone as three measurements on a single dominant cell. The degree of stability indicating that adaptation should be performed may be a function of zone size, cell density, measurement rate, and/or suitable combinations thereof. Also, the degree of stability need not be fixed, but could vary depending on one or more of these factors. For example, consider a small scale zone (approximately 500 $m^2$) in which a mobile radio terminal obtains measurements every second. In this example, a suitable degree of stability could be 10 consecutive measurements. In another example, in a larger zone (approximately 2500 $m^2$) in which measurements are taken every 60 seconds, two consecutive measurements could be sufficient to indicate stability. Depending on the application, a suitable number of measurements could be between about 1 and 3, between about 3 and 5, between about 5 and 8, between about 8 and 10, or between about 10 and 15. Additionally, the indicative degree of stability may be different for dominant and candidate elements.

"Temporal proximity" could be described as the degree of adjacency of measurements between dominant and candidate elements in the measurement cycles. If the dominant and candidate elements are sufficiently adjacent, then it is more likely that the mobile radio terminal remained close enough to the zone during the measurement cycles. Thus adaptation could be required when one or more dominant profile cells is sufficiently adjacent to one or more candidate cells in a series of measurements. The adjacency threshold may be a function of zone size, cell density, measurement rate, and/or suitable combinations thereof. Also, the adjacency threshold need not be fixed, but could vary depending on these factors. For example, in one embodiment where the target zone size is 250 m radius and the measurement interval is 60 seconds, the adjacency threshold could be 0 (i.e. the dominant element and the candidate element are reported in the same measurement set) or 1 (reported in consecutive measurements), since the mobile radio terminal could move a significant distance and in particular outside the zone in a time interval of 2 minutes or more. In this case the candidate measurements would have to be immediately before or after (or intermingled with in an alternating pattern) the dominant measurements. On the other hand, in the same zone, if the measurement interval was 1 second then the adjacency threshold could be 1 or 2 (i.e., there could be a one or two non-dominant, non-candidate element between the dominant and candidate elements). This is because it is unlikely that the mobile radio terminal would move a significant distance in a time interval of only a few seconds.

Accordingly, certain embodiments of the present disclosure will analyze the stability of dominant and candidate cells and the temporal proximity of these cells. By analyzing stability and temporal proximity, certain embodiments may distinguish between a mobile radio terminal that remains within the zone but detects an anomalous element that is not within the zone profile from a mobile radio terminal that simply leaves a zone. In the latter scenario, a sequence of dominant measurements (measured while within the zone) would likely be followed by a sequence of candidate measurements (measured from outside the zone) that vary across different cells because the mobile radio terminal is moving.

In some embodiments, the determination of whether adaptation is required for a specific candidate element utilizes weights based on the degrees of stability and temporal proximity. In these embodiments, the degree of stability of the candidate and dominant elements and the degree of temporal proximity is measured. The combination of these factors is then compared to a threshold. If the combination exceeds the threshold, then an adaptation is required. Otherwise, no adaptation is required for that candidate element. The degree of stability indicating that adaptation should be performed may be a function of zone size, cell density and measurement rate. Also, the degree of stability need not be fixed, but could vary depending on these factors.

As an example, consider a case in wherein the mobile radio terminal utilizes CellID to determine zone status. In this case, the mobile radio terminal checks the current serving cell every 60 seconds. A sequence of 3 or more cycles on a dominant cell followed by a sequence of 3 or more cycles on a remote cell would probably be inconsistent with a departure from the zone and therefore would support an adaptation being applied. On the other hand if the user was actually leaving the zone, typically the serving cells measured in the final 3 cycles will be different.

The inference of spatial proximity (i.e. that the mobile terminal remained stationary inside the zone) being derived from temporal proximity of reported measurements imposes an implementation requirement on the measurement collection reporting processing in the mobile terminal. For example, consider a case wherein a mobile radio terminal collects measurements and then the user powers off the terminal. The user then takes the terminal to a different location and powers it on again at which time measurement collection resumes. If the terminal simply retains the previous measurements and appends the measurements from the new location before transmitting a report, the adaptation processing could detect a qualifying pattern of measurements and incorrectly make an adaptation for one or more cells in the new location. Further complicating the issue, in certain embodiments using SIM Toolkit applets, measurement buffers may be reset following such a power cycle of the terminal. Additionally, in some cases, due to the peculiarities of SIM Toolkit processing it may be possible for a user to temporarily block measurement collection by an applet by lingering in the SIM toolkit menus. Therefore, it may be desirable for the mobile terminal measurement collection process to ensure that measurements that are reported as consecutive are actually consecutive.

Embodiments of the present disclosure may address these issues in a variety of ways. In certain embodiments, the zone provisioning and monitoring application may include a facility to detect this "starvation" and insert dummy cycles in the measurement buffer to prevent subsequent measurements appearing to be adjacent to those measurements collected before the interruption by the user. Using the GSM STK API as an example, if the user lingers in a STK menu, then the applet will be unable to complete the periodic measurement updates until the user exits the menu. In this case the applet can detect that this is the case by checking whether the proactive handler is available and if not, simply insert a dummy measurement. In alternative embodiments, the measurement cycles may include a time stamp to prevent mistakenly identifying non-adjacent elements. Similar issues can be encountered in other embodiments and corresponding measures could be applied that would be easily understood by those of ordinary skill in the art.

Alternatives to using the series of measurements to determine if the mobile radio terminal is close enough to the zone may include non-cellular radio network signals such as one or a combination of GPS/AGPS, GMLC, Wi-Fi network data such as RSSI, Bluetooth network data, and/or data from 2G/3G transitions. For example, if the zone is defined to be within specific geographic coordinates, a GPS/AGPS fix may be taken. This GPS/AGPS or GMLC fix may indicate that the mobile radio terminal was actually inside or outside the zone and that an adaptation is required. In another example, the zone may correspond to an area near a Wi-Fi network access point having a known location. The detection of the specific Wi-Fi access point's service set identifier (SSID) could indicate that the mobile radio terminal was close enough to the zone and that an adaptation is required.

Once the system determines that an adaptation is required, the system performs the zone profile adaptation (steps 325 and 335). The adaptation may be performed by the system in a number of different configurations. For example, in certain embodiments, the mobile radio terminal may determine that an adaptation is required, and then perform the adaptation on a stored zone profile. In other embodiments, the mobile radio terminal may determine that an adaptation is required, and then transmit the series of measurements to the zone server to have it perform the adaptation. In still other embodiments, the mobile radio terminal may not determine whether an adaptation is required, but when the mobile radio terminal transmits measurements to the zone server upon a zone status change, the zone server may perform the adaptation. In still other embodiments, the mobile radio terminal may not determine whether an adaptation is required, but the zone server may periodically request measurements from the mobile radio terminal, perform a determination based on the received measurements, and then perform the adaptation.

In cases wherein the zone server performs the zone profile adaptation, the zone server may transmit the adapted zone profile to one or more associated mobile radio terminals after the adaptation is completed. In cases wherein the mobile radio terminal performs the zone profile adaptation, the mobile radio terminal may transmit the adapted zone profile to the zone server, which may in turn transmit the adapted zone profile to one or more associated radio terminals. The zone profile adaptation may also be performed in a number of different ways. In certain embodiments, the adaptation may consist of appending the candidate element to the zone profile. The priority of the appended element may be minimal. For example, an appended cell probability for a candidate cell may have a minimum probability. This minimum probability will typically be just above the minimum threshold probability included in the profile.

In certain embodiments in which adaptations are made on the mobile radio terminal, the mobile radio terminal may take a series of measurements similar to the initial zone registration measurements described above to establish suitable values for the radio parameters of the element. For example, the mobile radio terminal may take another series of cell ID measurements to establish a probability similar to the registration procedure described above. In other embodiments in which adaptations are made on the zone server, the zone server may transmit a message to the application on the mobile radio terminal instructing it to take a series of measurements similar to the initial zone registration measurements described above to establish a probability for the element.

In certain embodiments, the adaptation may consist of appending the candidate element as a disabled element to the zone profile. This would effectively remove the element from the zone detection calculation. However, advantageously the presence of the added (disabled) cell could prevent an out-of zone status being returned due to the serving cell not being present at all in the profile.

In certain embodiments the adaptation may consist of appending the candidate element to the profile with a higher than normal sigma. For instance whereas profile entries for cells in suburban areas typically might be assigned a sigma value of 9 dB, a sigma of 18 dB could be assigned for the adapted cell. This would mean that if the assigned mean is offset significantly from the true mean level observed in the zone, the actual cost calculated for observations of this cell whilst within the zone would be relatively small.

Finally, the process of determining whether an adaptation is required may be repeated for each candidate element in the measurement set. If one or more changes have been applied to the profile by the zone server (step 340), the updated profile may then be transmitted to any associated mobile terminals (step 350). At this point, the adaptation process for this measurement set is complete (step 360).

Figure 3A:
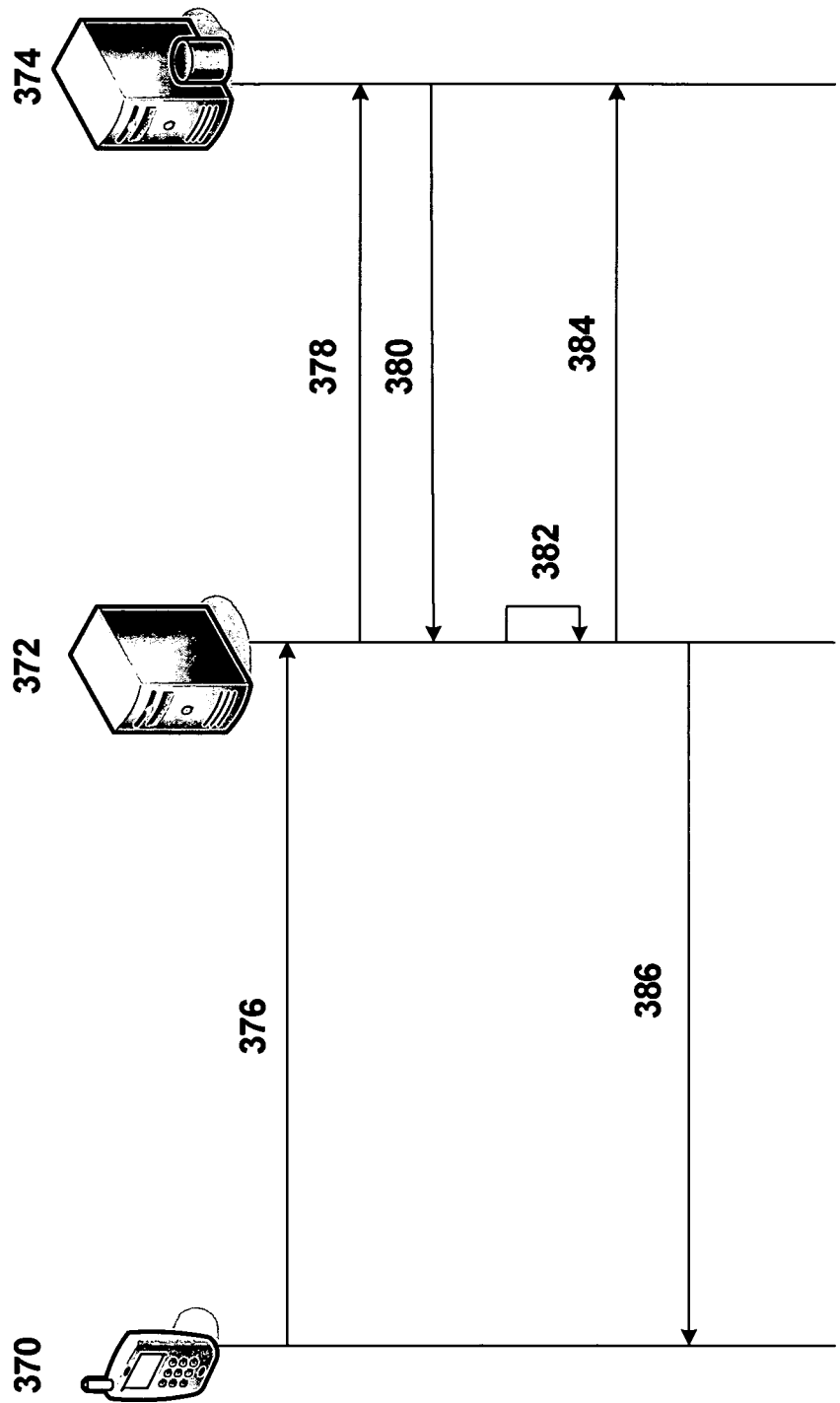
FIG. 3A illustrates an exemplary signal flow diagram in accordance with certain embodiments.

FIG. 3A illustrates a signal flow diagram between the an applet executing on the mobile radio terminal 370, a zone server 372, and a zone database 374 (i.e., a database that stores zone profiles) according to certain embodiments. As shown in FIG. 3A, the applet 370 determines that the mobile radio terminal has changed zone status (e.g., leaving a zone) and transmits a zone status update measurement and radio parameter measurements to the zone server in step 376. The zone server queries the zone database for the appropriate zone profile or profiles in step 378 and receives the profile(s) in step 380. The zone server analyzes the measurements, using the zone profile(s) to determine whether adaptation is required as described above in step 382. If adaptation is required, the server updates the profile in the zone database in step 384 and also pushes the updated profile(s) to the associated mobile subscriber(s) in step 386. In certain embodiments wherein a zone profile is associated with multiple subscribers, a zone status update from any associated subscriber could trigger an adaptation that results in an updated profile being pushed to all associated subscribers.

While the steps of the zone adaptation process were described in a particular order for exemplary purposes, embodiments of the present disclosure may include any order that produces similar results. For example, the process may first determine whether there were any candidate elements in the accumulated measurement cycles and then determine whether there were any dominant cells in the measurements. The described order of steps should not be construed as in any way limiting embodiments of the present disclosure.

The following sections illustrate applications of embodiments of the present disclosure in a series of real world examples.

Figure 4:
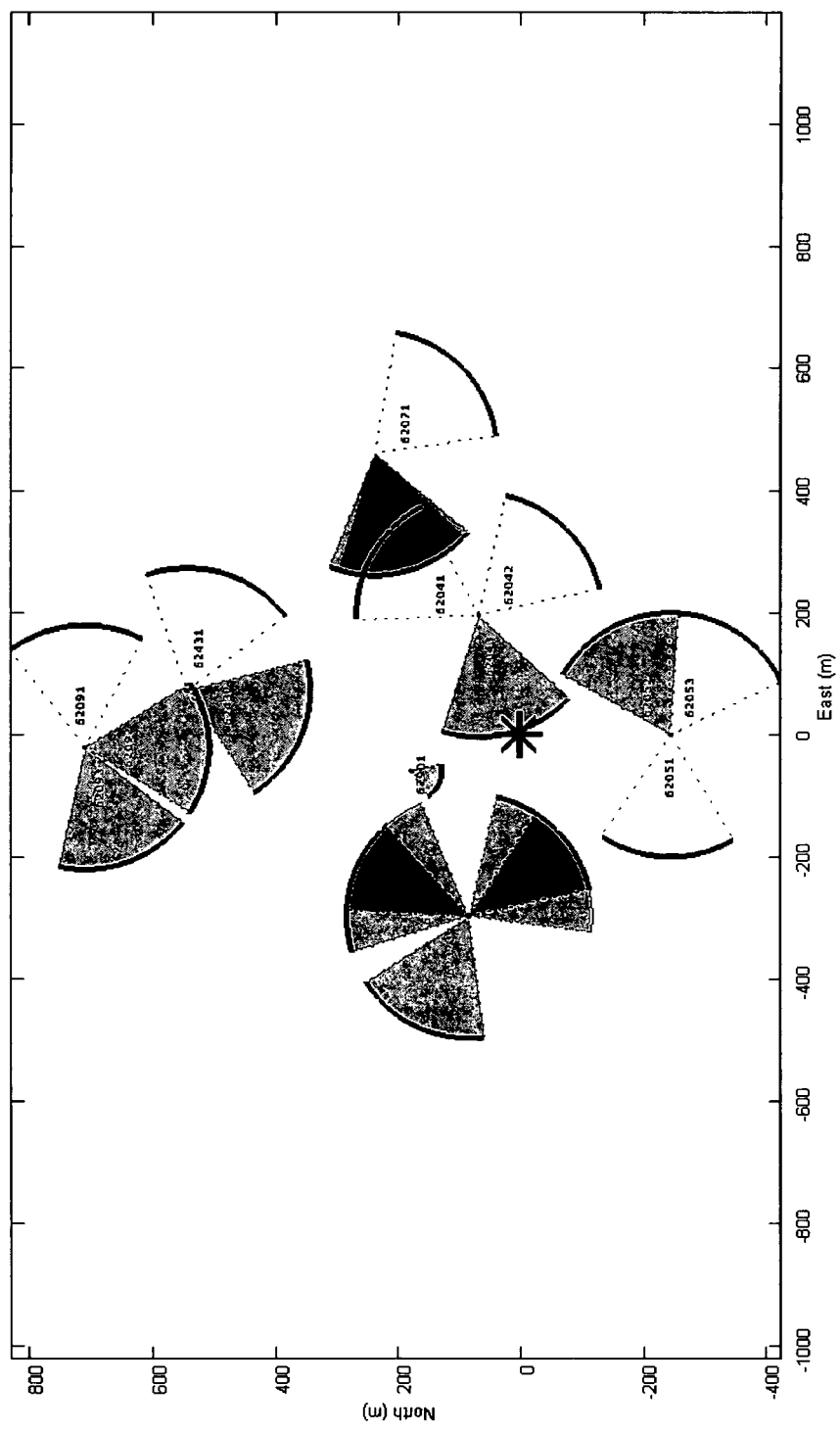
FIG. 4 illustrates an exemplary plot of a radio network in accordance with certain embodiments.

FIG. 4 illustrates an embodiment utilizing GSM NMRs to define and monitor zone location as described in PCT/AU2006/000478. In this example, a zone was defined representing a mobile subscriber's home in a dense urban area. The user carried out a self-registration process using a Sagem My400V GSM mobile phone during which time a STK applet on the SIM card collected a series of measurements.

TABLE 1

| CellID | ARFCN | BSIC | RxLev | Sigma | Prob |
|---|---|---|---|---|---|
| F5B5(62901) | 31 | 8 | −64 | 11.5 | 0.365 |
| F25B(62043) | 70 | 5 | −71 | 11.5 | 0.154 |
| F278(62072) | 86 | 24 | −77 | 11.5 | 0.063 |
| F264(62052) | 73 | 35 | −77 | 11.5 | 0.063 |
| F3A4(62372) | 113 | 14 | −78.4 | 11.5 | 0.051 |
| F3A3(62371) | 115 | 57 | −79 | 11.5 | 0.046 |
| F28D(62093) | 76 | 58 | −81.4 | 11.5 | 0.03 |
| F3E0(62432) | 32 | 2 | −82 | 11.5 | 0.027 |
| F28C(62092) | 72 | 56 | −83 | 11.5 | 0.022 |
| F3A5(62373) | 121 | 60 | −83.9 | 11.5 | 0.019 |

Figure 5:
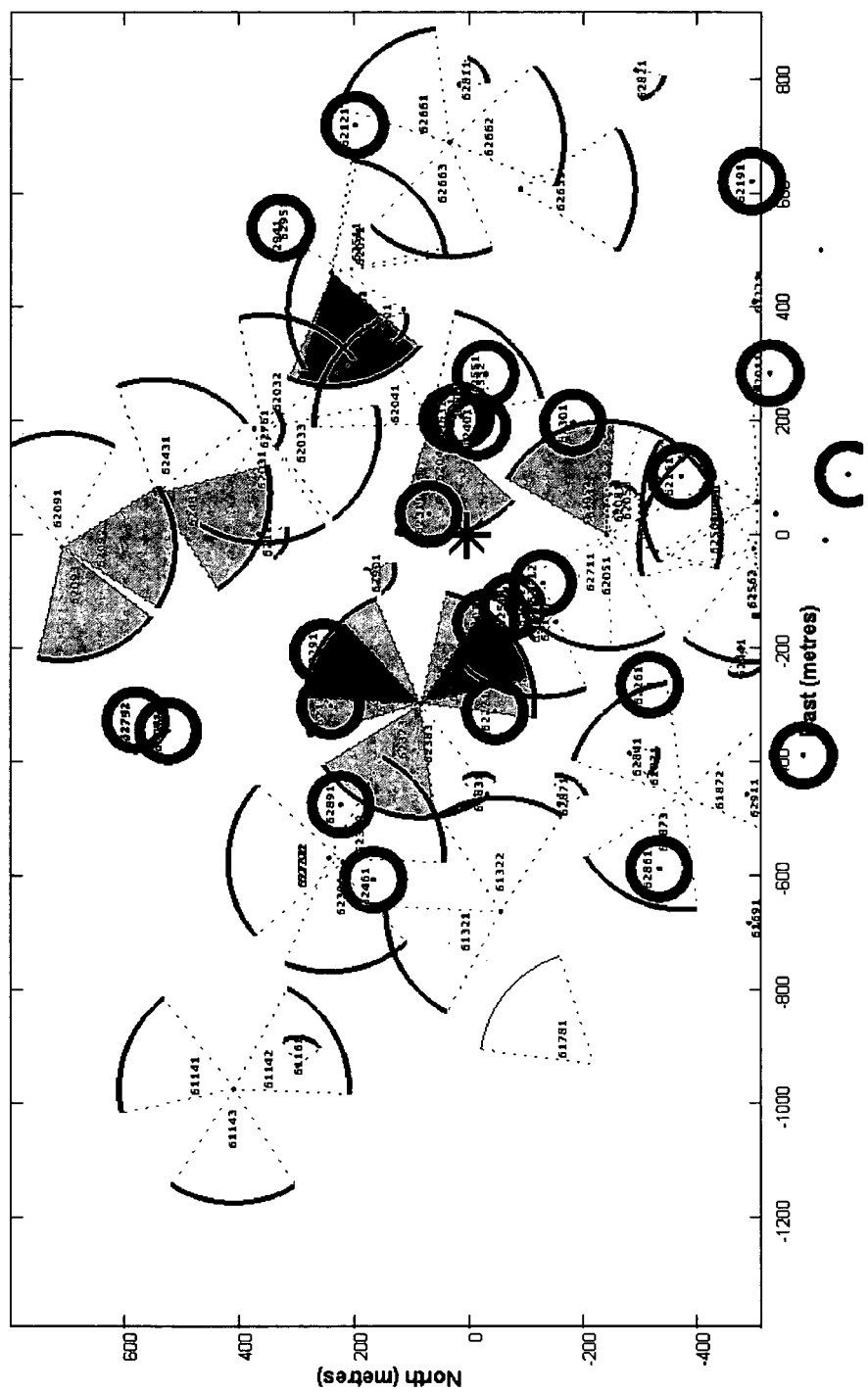
FIG. 5 illustrates an exemplary plot of a radio network in accordance with certain embodiments.

Table 1 shows the cells in the resulting zone profile and some of their attributes in the profile. The corresponding cells are shaded in FIG. 4. The actual location of the home is marked with an asterisk. FIG. 5 shows the same scenario, this time showing a larger area of the radio network around the home. The pattern shows that the cells in the vicinity that are oriented towards the home were measured by the user's terminal and appear in the resulting profile. Note that the varying intensity of shading in the plot reflects the relative priorities of the cells in the profile.

Figure 6:
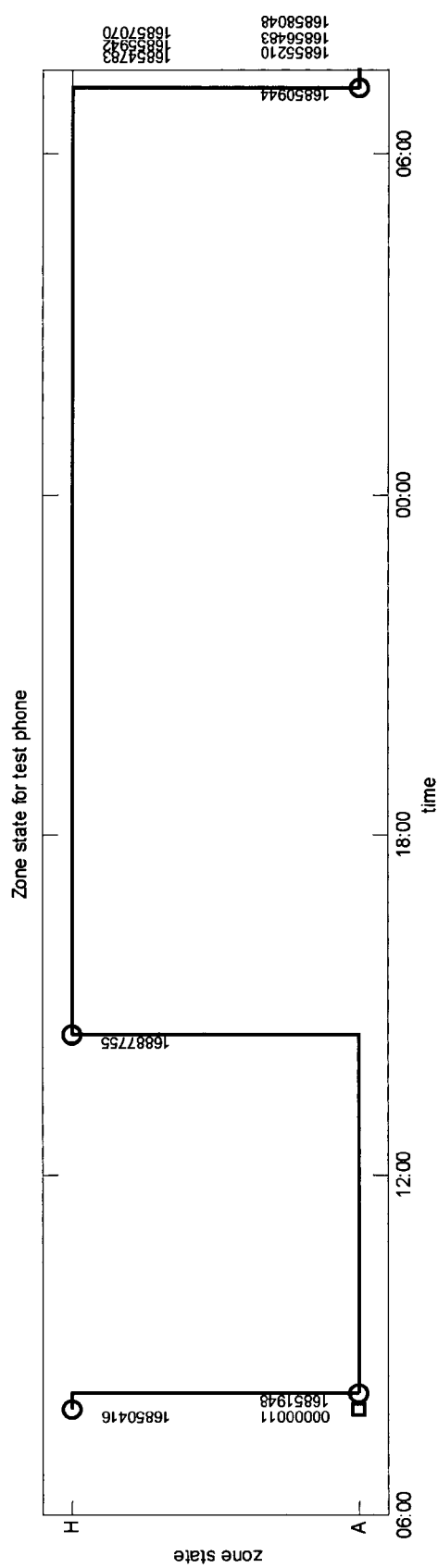
FIG. 6 illustrates an exemplary zone status of a mobile radio terminal in accordance with certain embodiments.

Following the self registration the resulting zone profile was installed on the SIM and zone monitoring commenced. For approximately 15 minutes the zone detection processing correctly determined the mobile to be within the zone. However after this period, the idle cell reselection process in the mobile selected a distant cell, shown highlighted in the lower left of FIG. 5 as 61781. The zone state as a function of time is illustrated in FIG. 6. For the full 24 hrs following the registration the phone was left within the home but moved around randomly to different rooms. The phone remained camped on the remote cell 61781 for approximately 6 hours before reselecting back to one of the cells in the profile. Detailed investigation revealed that this remote cell was detected within the home because of a particular propagation situation wherein the remote cell antenna was elevated 40 m above ground level on a motorway. In addition, by chance, there was a direct line of light afforded by gaps between adjacent apartment blocks to the cell.

The challenges posed by this situation are threefold. The measurement process at service initialization failed to detect this cell. Predictions using a propagation model also would probably not cause this remote cell to be included in the profile because it is a relatively large distance away and there are several nearer cells. The third challenge is that the radio network database in this case had an incorrect height specified for the remote cell, the value being 12 m rather than the real height of approximately 40 m, further decreasing the likelihood that a prediction model would select this cell.

One possible solution for such situations is to widen the range of neighboring cells that are included in the zone profile based on prediction. This could be done for instance by obtaining predicted signal levels for all cells within some range of the zone. The selection threshold could be reduced sufficiently to encompass this remote cell. Naturally this would also include many nearer cells which measurements show do not need to be in the profile. In other words the zone reliability could be improved but at the cost of a significant, undesirable increase in the zone size.

It would be preferable if such "special" cells could be selectively identified and incorporated into the zone profile. In simple terms the objective could be stated as "identify any remote cells which actually can be selected as serving cells within the zone from time to time and incorporate them in the profile". This objective may require some knowledge of when the phone is actually within the zone in order to identify such cells that are selected despite the phone being within the zone. By determining whether the mobile radio terminal was actually in the zone or not, the identification of these problem cells can be achieved using the radio measurements transferred along with change of zone status measurements in the SeekerZone™ system.

There remains however a circular problem because the system is at the same time seeking to determine whether the phone is within the zone based on the radio measurements. Rather than relying on such knowledge, however, embodiments of the present disclosure instead use the serving cells that were selected either immediately before or after the remote cell. If the preceding or succeeding cell is a dominant cell in the existing profile, the system concludes that the other reported cell is a transition cell with a non-zero probability of being selected as a serving cell within the zone. The profile is then adapted to include such cells in the profile.

Returning to the test scenario, the radio measurements reported along with the out-of-zone status change notification at 08:07 included the sequence of serving cell measurements shown in Table 2. The measurements in this case were spaced at 30 second intervals.

TABLE 2

| Measurement cycle | CellID | RxLev(dBm) |
|---|---|---|
| 00 | 62901 | −071 |
| 01 | 62901 | −077 |
| 02 | 61781 | −073 |
| 03 | 61781 | −074 |
| 04 | 61781 | −074 |
| 05 | 61781 | −073 |

From this example it is clear that the phone was camped on the strongest cell (a dominant cell) in the profile prior to reselecting to 61781. Accordingly, based on the fact that the dominant cell measurements were adjacent to the 61781 measurements, the system will conclude that there is a possibility of 61781 being selected as a serving cell within the zone and an adaptation may be required. An adaptation step may be initiated in the server upon receipt of this status update or the mobile radio terminal may perform the adaptation. To perform the adaptation, remote cell 61781 is added to the zone profile.

One point to note in this example is that the existing entries in the profile include RxLev models based on a collection of measurements, typically taken within the zone at service initialization. When adding an entry to the profile for the new cell, the system does not have the same level of information about the typical signal levels for this cell observed within the zone (the adaptation may be made based on a single observation of the cell reported to the server). The risk with simply assigning the RxLev observed in the recent report is that this may be a statistically unlikely value and therefore on average the zone detection algorithms, using this RxLev parameter would tend to indicate an out of zone state. Embodiments of the present disclosure may address this problem in a variety of ways as described above. In this example, one solution may be to use the reported RxLev but to assign a relatively large sigma reflecting the relatively large uncertainty about the range of rxLev values that may be observed for this cell within the zone. For instance whereas profile entries for cells in Suburban areas typically might be assigned a sigma value of 9 dB, we could assign a sigma of 18 dB to the adapted cell. The result in this case is a smaller cost values for a given rxLev difference between measurement and profile. An alternative may be to add the new cell but set the disable parameter, removing this cell from the zone detection calculation. The presence of the added (disabled) cell is still beneficial because the initial serving cell in profile check passes, in other words the zone status is not deemed as out of zone on account of the serving cell not being present in the profile.

Figure 7:
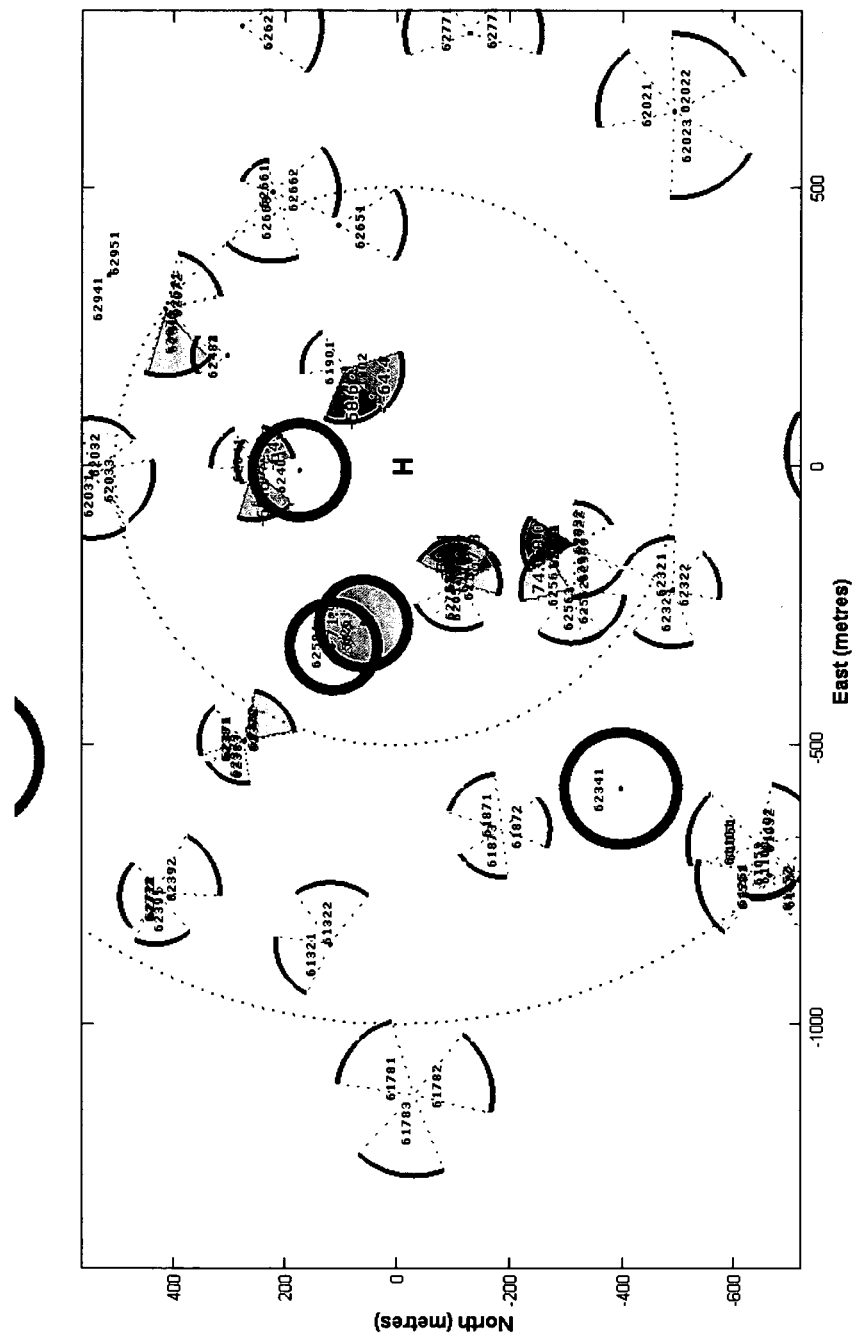
FIG. 7 illustrates an exemplary plot of a radio network in accordance with certain embodiments.

FIG. 7 illustrates an embodiment utilizing cell ID probability measurements to define and monitor zone location as described in PCT Application PCT/AU2008/000344. Note that in FIG. 7, several actual cells in the vicinity (micro & pico cells) that have no bearing on the example have been omitted from the illustration to reduce the clutter. Similar to the above example, in this example, a zone was defined representing a mobile subscriber's home in a dense urban area. The user carried out a self-registration process using a Motorola V3 GSM mobile phone, a handset model which supports only cell ID measurements in idle mode, during which time a STK applet on the SIM card collected a series of measurements.

The profile generated after this registration is shown in Table 3 below.

TABLE 3

| CellID | ARFCN | BSIC | Probability |
|--------|-------|------|-------------|
| 61903  | 79    | 9    | 0.1908      |
| 62052  | 73    | 35   | 0.1404      |
| 61902  | 81    | 9    | 0.0978      |
| 62712  | 569   | 27   | 0.0978      |
| 62042  | 77    | 22   | 0.0948      |
| 62053  | 71    | 39   | 0.0667      |
| 62931  | 571   | 36   | 0.0612      |
| 62921  | 84    | 58   | 0.0612      |
| 62043  | 70    | 5    | 0.0559      |
| 62612  | 68    | 16   | 0.0349      |
| 62713  | 557   | 27   | 0.0283      |
| 62561  | 117   | 1    | 0.0251      |
| 62512  | 565   | 19   | 0.0232      |
| 62382  | 562   | 45   | 0.0219      |

Figure 8:
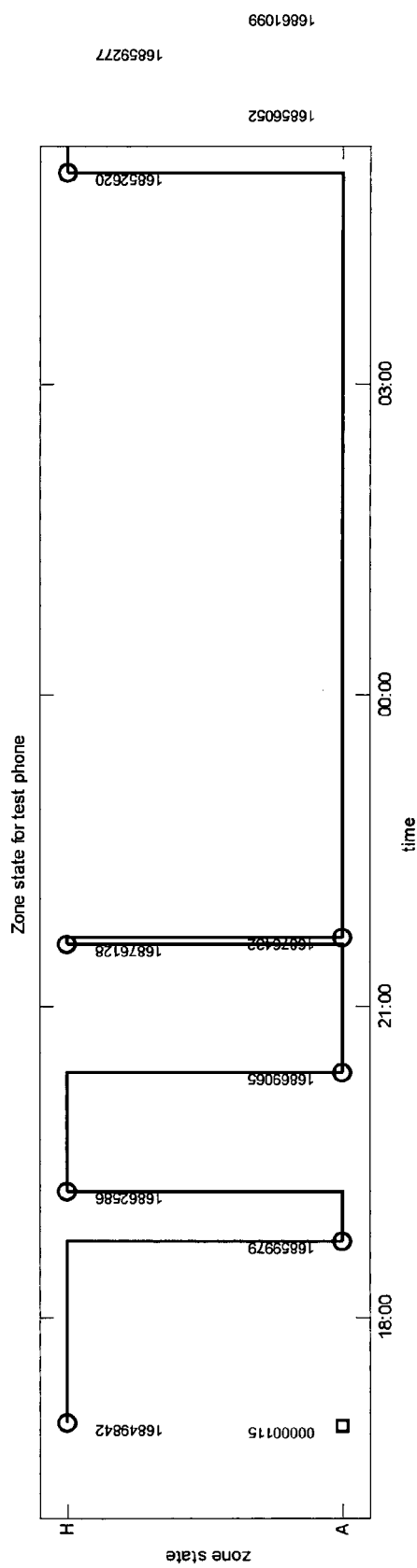
FIG. 8 illustrates an exemplary zone status of a mobile radio terminal in accordance with certain embodiments.

The zone state versus time is shown in FIG. 8. In this case after the registration, the zone status remained in-zone for approximately 2 hours before transitioning to out-of-zone. Inspection of the radio measurements in the out-of-zone status update message showed the series of serving cell measurements shown in Table 4 below. In this case following a period camped on cell 62371 (the strongest cell in the profile) the handset reselected onto the remote cell 61781.

TABLE 4

| Measurement cycle | Cell ID |
|-------------------|---------|
| 01 | 61903 |
| 02 | 61903 |
| 03 | 61903 |
| 04 | 61903 |
| 05 | 61903 |
| 06 | 61903 |
| 07 | 61903 |
| 08 | 61903 |
| 09 | 61781 |
| 10 | 61781 |
| 11 | 61781 |
| 12 | 61781 |
| 13 | 61781 |
| 14 | 61781 |
| 15 | 61781 |

As with the previous example, the remote cell 61781 will be added into the profile. In this case, however, because the profile is an enhanced Cell ID profile, the zone determination algorithm operates on the probability of cell detection. Therefore the probability is set to the smallest probability that exceeds the threshold. This means that a reselection to this cell will no longer cause an out-of-zone transition. Table 5 shows the updated profile after the adaptation. Advantageously, because the adaptation may be done with reference to dominant elements of the profile that were present at the original zone definition, there may be a reduced risk of what might be termed "zone creep", i.e. continual adaptations that extend the zone infinitely. This "zone creep" could be a problem with some learning algorithms that continually adjust and can diverge from the original operating point.

TABLE 5

| CellID | ARFCN | BSIC | Probability |
|--------|-------|------|-------------|
| 61903  | 79    | 9    | 0.1908      |
| 62052  | 73    | 35   | 0.1404      |
| 61902  | 81    | 9    | 0.0978      |
| 62712  | 569   | 27   | 0.0978      |
| 62042  | 77    | 22   | 0.0948      |
| 62053  | 71    | 39   | 0.0667      |
| 62931  | 571   | 36   | 0.0612      |
| 62921  | 84    | 58   | 0.0612      |
| 62043  | 70    | 5    | 0.0559      |
| 62612  | 68    | 16   | 0.0349      |
| 62713  | 557   | 27   | 0.0283      |
| 62561  | 117   | 1    | 0.0251      |
| 62512  | 565   | 19   | 0.0232      |
| 62382  | 562   | 45   | 0.0219      |
| 61781  | 70    | 53   | 0.0470      |

An advantage of certain embodiments of the present disclosure for adapting the zone definition is that reliability issues can be addressed in an automatic way by the zone detection system without waiting for customers to call to complain. A further advantage may be that some embodiments discourage fraud. In existing systems that employ a list of cells as the zone definition and lack an adaptation mechanism such as disclosed herein, there is a risk of encouraging fraudulent complaints by users. If a particular has a zone reliability issue and makes a service complaint, the typical response by the service provider would be to add extra cells to the zone definition thereby increasing the zone size. This tends to encourage subscribers to make fraudulent complaints in order to increase the region where they enjoy discounted rates. By automatically detecting reliability issues and adapting to resolve them embodiments of the present disclosure minimize or remove this incentive for fraudulent complaints.

Aside from improving the reliability of zones where a serving cell was not measured during the registration process but does get selected subsequently by handsets within the zone, the present invention provides a range of additional advantages which will be described in the following paragraphs.

In some applications a zone may be defined for more than one radio network. Consider for example the case of a dual mode (GSM & UMTS) capable terminal. Depending on the quality of the radio network coverage in the zone, the terminal may autonomously reselect between networks in real time in response to variations in the observed network coverage. For a reliable, stable zone detection capability, it may be desirable to define profiles for the zone representing both networks. This may be referred to as inter-RAT (Radio Access Technology) zone adaptation.

In such cases, application of embodiments of the present disclosure becomes potentially more complex, depending on the implementation. Where the different radio networks are modeled using separate profiles, it may be necessary to support adaptation not only within each individual profile (GSM and UMTS) but also between profiles (GSM to UMTS and vice versa). For example, consider the scenario wherein a dual mode cellular terminal is camped on a dominant 3G profile cell and then drops back on to the GSM network where it remains camped for the next several cycles on a GSM cell which is not in the current GSM profile. In this case, the temporal proximity of the non-profile 2G cell to the dominant 3G cell indicates that the 2G cell should be present in the corresponding profile.

The following paragraphs illustrate a real world example of this type of inter-network adaptation. It should be noted that while this example employs a dual mode 2G/3G terminal, this is not a limitation on embodiments of the invention. Alternative embodiments may perform adaptation between cellular/Wi-Fi or cellular/Bluetooth or even more complex combinations of radio networks.

Figure 9:
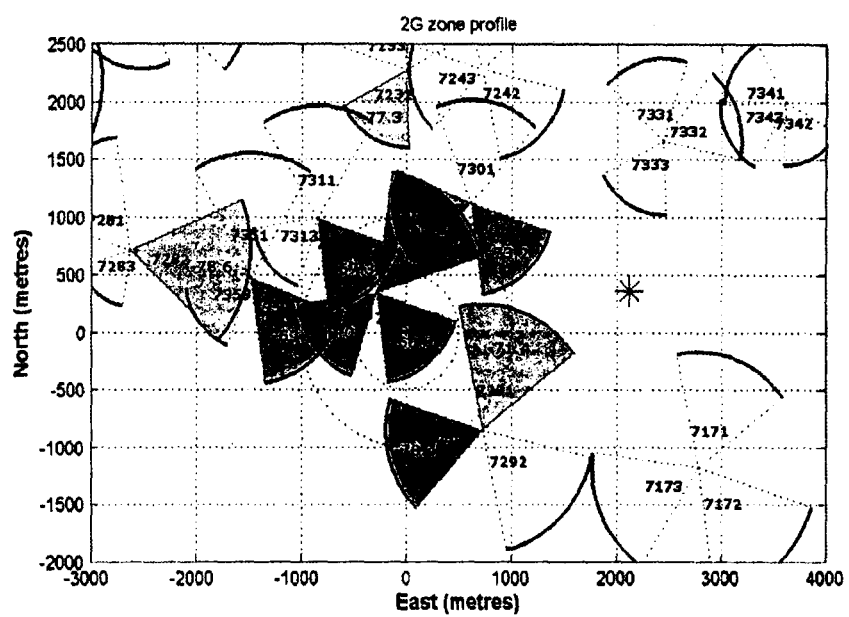
FIG. 9 illustrates an exemplary plot of a radio network in accordance with certain embodiments.
Figure 10:
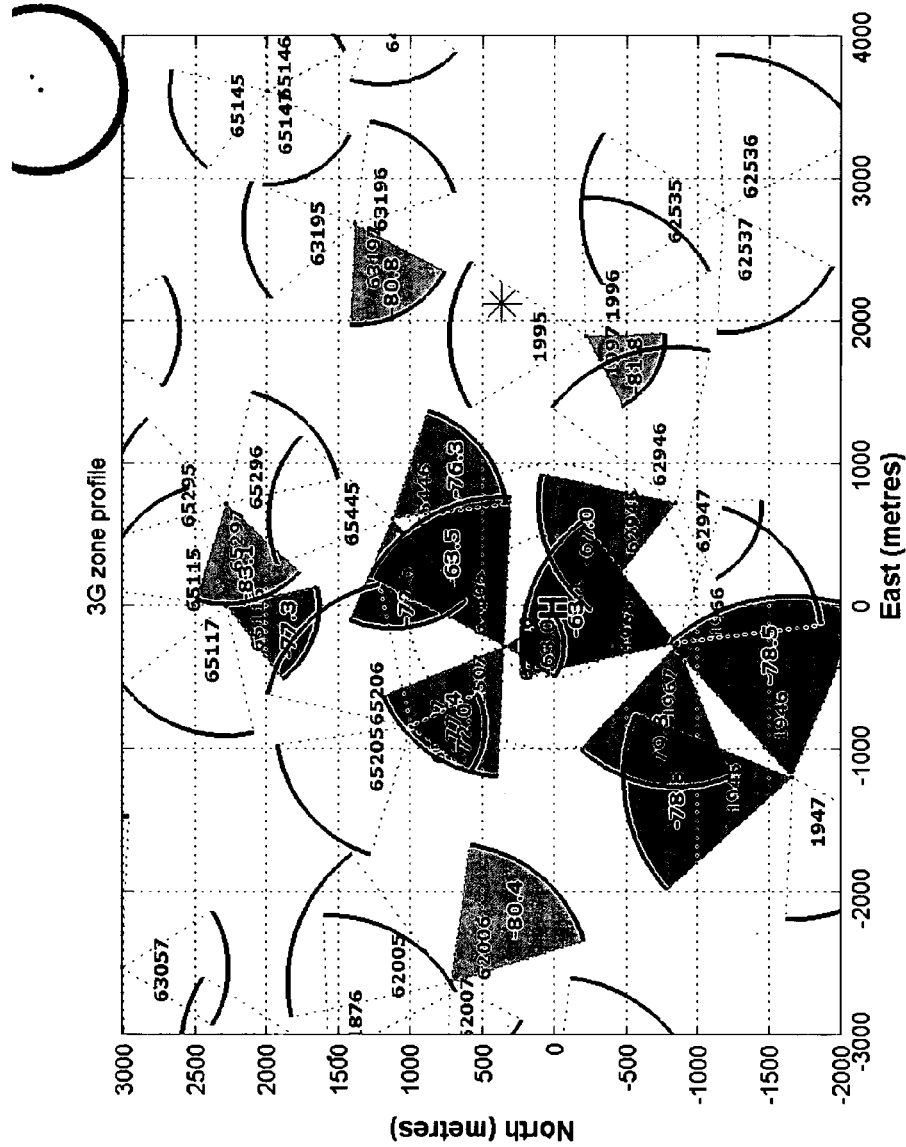
FIG. 10 illustrates an exemplary plot of a radio network in accordance with certain embodiments.

In this example, a subscriber owns a dual mode 2G/3G device and the zone has been configured for definition using separate profiles for the 2G & 3G networks. The zone definition was made using measurement made by the subscriber's terminal for a period of 60 seconds while situated within the home. The mobile radio terminal in this case was configured in dual network mode but for some reason, which is not relevant to the instant example, at the time of the registration was operating on the 2G network. The result is that the zone profile for the 2G network was defined using a combination of measurements and prediction as disclosed in PCT Application PCT/AU2008/000344 while the 3G profile was defined using predictions only, taking as a reference the estimated location of the home obtained from the 2G measurements. FIGS. 9 and 10 show the resulting 2G and 3G profiles respectively. Tables 6 and 7 below show the cells featured in these profiles. The true location of the home in this case is marked with an asterisk, while the estimated location of the home based on the 2G measurements is marked with a "H". Inspection of the plots will show that there is a significant offset in the estimated location of the home from the true location. In this example, this was caused by the fact that the terminal camped for the entire 60 second registration process on 2G cell 7322. Despite this offset in the estimated location, the zone reliability on the 2G network over subsequent days was good due to the fact that the terminal continued to camp on either cell 7322 or 7291 which was also in the original profile. Additionally, during the course of the next day an adaptation cycle within the 2G network occurred which added 7333 to the 2G profile, further improving the reliability of the 2G profile. Note, however, that this is an example of an intra-network adaptation such as already described previously rather than an inter-RAT adaptation which is the focus of this example.

In the case of the 3G network however the significant offset in the estimated origin used for the zone propagation prediction causes more significant reliability problems. As can be seen from FIG. 10, the nearest cell 1995 was not even included in the predicted zone profile. Subsequent testing at this zone confirmed that, as expected, when the terminal was operating on the 3G network the zone reliability was very poor. In this case the intra-network adaptation mechanism described previously does not assist in resolving the situation. This is because the spatial offset in the zone profile is so large that there is virtually zero likelihood of observing the required transition measurements between 3G cell 1995 and any of the dominant cells in the existing 3G profile. This therefore is a case where an inter-RAT adaptation mechanism is preferable.

TABLE 6

2G profile

| CellID | ARFCN | BSIC | Probability |
|--------|-------|------|-------------|
| 7322 | 84 | 5 | 0.3248 |
| 7323 | 79 | 39 | 0.2044 |
| 7321 | 70 | 59 | 0.1157 |
| 7312 | 72 | 33 | 0.0961 |
| 7303 | 81 | 24 | 0.0624 |
| 7352 | 67 | 26 | 0.0575 |
| 7293 | 69 | 8 | 0.0518 |
| 7291 | 73 | 7 | 0.0418 |
| 7302 | 77 | 37 | 0.0279 |
| 7232 | 75 | 28 | 0.0101 |
| 7282 | 122 | 50 | 0.0071 |

TABLE 7

3G profile

| CellID | ARFCN | BSIC | Probability |
|--------|-------|------|-------------|
| 62506 | 10588 | 446 | 0.2030 |
| 1965 | 10588 | 469 | 0.2005 |
| 62505 | 10588 | 445 | 0.1908 |
| 62945 | 10588 | 88 | 0.1207 |
| 65207 | 10588 | 411 | 0.0581 |
| 65447 | 10588 | 468 | 0.0528 |
| 65446 | 10588 | 467 | 0.0285 |
| 65116 | 10588 | 407 | 0.0239 |
| 62507 | 10588 | 447 | 0.0235 |
| 1946 | 10588 | 473 | 0.0192 |
| 1945 | 10588 | 472 | 0.0182 |
| 1967 | 10588 | 471 | 0.0166 |
| 62006 | 10588 | 377 | 0.0134 |
| 63197 | 10588 | 111 | 0.0124 |
| 1997 | 10588 | 114 | 0.0102 |
| 65297 | 10588 | 444 | 0.0078 |

Table 8 below shows the contents of a status update message transmitted by the subscriber's terminal on a subsequent day when the terminal was manually forced back into GSM mode. After a few cycles the zone monitoring applet reported a transition to an in-zone state based on the 2G zone profile. Note that the sequence of radio measurements includes both 2G cells and 3G cells. In particular, the terminal reports 3G cell 1995 as the serving cell for 3 cycles after which it appears that the terminal has fallen back onto the 2G network and reports several cycles of 2G cell 7322, which in this case happens to be a dominant cell in the 2G radio profile. The temporal proximity of 2G cell 7322 and 3G cell 1995 cause the system to determine that an adaptation was required. In this case the inter-RAT adaptation processing adds a new entry for cell 1995 into the 3G radio profile. The updated profile is shown below in Table 9.

TABLE 8 status update radio measurements

| Measurement cycle | Cell ID |
|-------------------|---------|
| 01 | 1995 |
| 02 | 1995 |
| 03 | 1995 |
| 04 | 7322 |
| 05 | 7322 |
| 06 | 7322 |
| 07 | 7322 |
| 08 | 7322 |
| 09 | 7322 |
| 10 | 7322 |

TABLE 8-continued status update radio measurements

| Measurement cycle | Cell ID |
|---|---|
| 11 | 7322 |
| 12 | 7322 |

TABLE 9 updated 3G profile after adaptation

| CellID | ARFCN | BSIC | Probability |
|---|---|---|---|
| 62506 | 10588 | 446 | 0.2030 |
| 1965 | 10588 | 469 | 0.2005 |
| 62505 | 10588 | 445 | 0.1908 |
| 62945 | 10588 | 88 | 0.1207 |
| 1995 | 10588 | 112 | 0.0700 |
| 65207 | 10588 | 411 | 0.0581 |
| 65447 | 10588 | 468 | 0.0528 |
| 65446 | 10588 | 467 | 0.0285 |
| 65116 | 10588 | 407 | 0.0239 |
| 62507 | 10588 | 447 | 0.0235 |
| 1946 | 10588 | 473 | 0.0192 |
| 1945 | 10588 | 472 | 0.0182 |
| 1967 | 10588 | 471 | 0.0166 |
| 62006 | 10588 | 377 | 0.0134 |
| 63197 | 10588 | 111 | 0.0124 |
| 1997 | 10588 | 114 | 0.0102 |
| 65297 | 10588 | 444 | 0.0078 |

In some radio environments there can be significant differences in the set of cells which may be selected as the serving cell. In the home zone scenarios described above, two different models of handset were used. During the testing, the handsets were placed side by side in the same locations in the home for the duration of the test. Comparing the measurements reported purely during the registration process for instance, the Sagem varied between 2 serving cells: 61903 & 62901. The Motorola camped exclusively on cell 61903 for the duration of the same measurements.

The reasons for these differences may include different implementations of radio hardware, cell reselection algorithms or may even be attributable to differences in the channel equalizers employed by the 2 handsets. However the important result is that especially for enhanced Cell ID zones, it is possible that different handsets will choose different cells to camp on within the zone. In many commercial applications it is desirable to be able to measure the zone using one particular handset and then use the resulting definition with other handsets. Embodiments of the present disclosure allow a zone monitoring system to account for differences variations between handsets by adapting the profiles for various mobile radio terminals. Advantageously, this helps preserve zone reliability and stability across handset models.

Embodiments of the present disclosure may also facilitate adaptation of zones in response to network changes. For example, one change that may be handled is the addition of a new cell to the network. Without utilizing zone adaptation, compensating for a new cell addition would typically rely on a propagation prediction model. However, there is once again a degree of uncertainty in such models. Additionally, if a cell is added at a relatively large distance from the zone but due to the particular characteristics is received with a relatively strong level within the zone, the profile update processing may neglect the new cell. This could result in a degradation of zone reliability and/or stability.

For example, consider the example previously discussed in relation to FIGS. 4 and 5. However, instead of the problem cell 61781 being undetected during registration, it is actually not present in the network when the zone is registered. The resulting profile would be the same as previously shown because it was not reported. Consider then what happens after the cell is added to the network. The update processing would predict a signal level for the added cell 61781. However, because it would be relatively low, the system would not make any changes to the profile. Once the new cell 61781 was activated, we can expect a similar impact on the reliability and/or stability of the zone as shown in FIG. 6.

This type of situation represents a further challenge for a zone monitoring system. One solution for accommodating this type of scenario without losing zone reliability would be to widen the range within which new cells are added to the profile. However, this would necessitate an increase in zone size, which is generally not desirable.

Consider now the benefit of the adaptation mechanism disclosed herein. In the present scenario, having not made any change to the profile following the activation of the new cell 61781, the mobile radio terminal experiences fluctuations in the zone status as illustrated in FIG. 6. However with the zone adaptation processing being carried out on each status update, we detect the transitions between the new cell 61781 and the existing dominant profile entries and update the profile, adding a new entry corresponding to cell 61781.

While the preceding example describes a scenario wherein a cell is added, the same benefits are available for a range of other network change scenarios. These might include where a cell such as 61781 was originally commissioned with the antenna pointing away from the zone. In subsequent network tuning the antenna might be reoriented towards the zone. The same sequence as described above would apply. Other similar change scenarios include adjustments to antenna height, tilt, or indeed the antenna itself as well as increases in transmission levels. In all of these cases, the processing is the same and does not depend on the specific type of change that has taken place, merely that there was an observed change in the radio measurements by the mobile radio terminal in the zone. The adaptation may also provide benefits in situations where the environment rather than the radio network changes. Such changes might include the removal of a building which previously served to block the signals from a cell being received in the zone. Another scenario might be the dramatic change in tree foliage in some regions.

Another benefit from the use of an adaptation mechanism is an increased degree of resilience to network database errors. For example, consider a scenario in which a new cell is added very close to an existing zone. However, the physical location specified in the updated network database was significantly in error, incorrectly indicating the location of the cell to be a long way from the zone. Such errors are unfortunately quite common in cases where the location coordinates are manually input by humans. A simple transposition of two digits in a latitude or longitude can translate into very large positional offsets. The network update processing would not make any changes to the profile on account of the new cell since its location is specified to be a long way from the zone. Without any ongoing adaptation this error would degrade the zone reliability. However using the method disclosed herein, a history of transitions between a dominant cell and the new cell would cause an adaptation to be applied, thereby stabilizing the zone.

Similar benefits are available for errors existing when the zone is first registered. Also errors in other parameters such as antenna height, tilt, azimuthal orientation or transmission level.

In some cases it may be advantageous to limit the degree of adaptation which can be performed for any given zone profile. One motivation for this is that the analysis which is carried out in determining whether any adaptation should be performed is time consuming. For an embodiment in which a network based server receives status changes from a very large number of terminals, the workload associated with analyzing the measurements in each status update may represent a very significant processing load, in turn requiring a large infrastructure expenditure. Accordingly in some embodiments, the adaptation processing is carried out only for a limited duration following the measurement and definition of the profile. For instance with a home zone solution, the adaptation processing might be carried out for the first week following the definition of the zone. After this time, no further adaptation analysis would be carried out. By conducting the analysis for the first week any zone reliability issues which required adaptation to resolve should have been resolved.

For limiting the adaptation processing, other measures than elapsed time could be employed. One alternative would be to count the number of status changes that had occurred. The adaptation processing might be suspended after about 5, 10, 20, 30, 40, 50, 60 or 70 status updates. Another alternative would be to suspend the adaptation analysis after a number of actual adaptations had been carried out. For instance after about 2, 4, 6, 8 or 10 changes had been made to the profile, the processing could be suspended. In typical embodiments, the most important adaptation would have been performed by this time.

In some embodiments, a facility would be provided to re-enable the adaptation processing for a particular zone. This could be useful in the event that a change in either the terminal, the radio network or the environment meant that zone stability of reliability had deteriorated. In this case, the adaptation processing could be re-enabled for a limited period, for instance a week or for a defined number of additional adaptations. Such a facility could be used for instance by customer care personnel in attending to a customer report concerning the zone status. In one embodiment, the adaptation processing could be re-enabled automatically if an analysis of the gross pattern of status changes indicated that the zone stability had degraded below a defined threshold, for instance if repeated zone status changes were detected for a home zone during the night.

Embodiments of the present disclosure may also be advantageous in cases where it is desired to define a zone around an arbitrary location without the aid of a network database. For example, assume that a user completes the zone registration process with a phone that supports only cell ID measurements. Without the aid of a network database, the only cells that can be included in the profile are the ones specifically measured during the registration process. However, in cases where the registration period is relatively short, this may increase the risk that a dominant cell in the area may not have been reported in that period. This missed dominant cell may be selected later during operation, thereby causing problems for the zone's reliability and stability. The operation of the zone on an ongoing basis without a network database could also prove problematic since the system would be unaware of changes made to the network configuration in the vicinity of the zone.

Using the embodiments of the present disclosure it becomes more feasible to commence zone monitoring with only the measured cell or cells. Subsequent to registration, any other neighboring cells that can also serve mobile radio terminals within the zone may be identified from the status update messages or other messages bearing radio parameters measurements and incorporated into the zone profile. The use of the zone adaptation mechanism disclosed herein also enables any significant changes to be accommodated thereby preserving the zone reliability and stability. For an example of the operation of the zone monitoring application, see PCT/AU2006/000478.

Embodiments of the present disclosure may also facilitate a purely terminal based zone monitoring approach to operate with improved reliability and stability. The initial zone definition could be derived from measurements performed by the terminal. As previously noted, however, the temporal variations in mobile radio coverage and serving cell selection by mobile terminals may mean that a short measurement duration may not provide sufficiently representative measurements to enable a reliable and stable zone definition.

In such cases, embodiments of the present disclosure may be implemented at the terminal to detect patterns of cell measurements that reflect other neighboring cells zone that should be accommodated in the profile. The discrimination based on the temporal proximity to original (dominant) profile cells along with the requirement for sequences of consistent reports enable the terminal to distinguish between cases where it remains within the zone and should make a profile adaptation from cases where it has left the zone and should simply report an out-of-zone status.

Some users may find any requirement to perform an initial measurement process too burdensome to complete. Embodiments of the present disclosure may also facilitate a purely radio propagation model based initial registration with improved reliability and stability. As described above, a radio propagation based model may have reliability or stability problems if the model was based on erroneous inputs (e.g., the network database erroneously fails to include a cell close to the desired zone). In such cases, embodiments of the present disclosure may be implemented at the terminal or zone server to detect patterns of cell measurements that reflect other neighboring cells zone that should have been accommodated in the profile.

Certain embodiments of the adaptation methods, systems, and/or devices disclosed here can be applied in the context of a network CID based zone detection system. Typically in such systems, the zone profile consists simply of a list of the nearby cells. When a call is processed by the network, if the cell serving the subscriber's terminal is present in the list then the subscriber is deemed as in zone, otherwise the subscriber is deemed to be out of the zone.

Certain embodiments disclosed may enhance such systems by associating a priority with each of the element of the profile. This priority could be computed in a number of ways. For instance on the basis of the distance from the zone to the respective cells. Other examples would be using predicted signal levels from each cell received within the zone, measured signal levels from each cell received within the zone, at least one cell identified during service initiation, or combinations thereof. The dominant elements of the profile may be those having a priority greater then or equal to a suitable threshold. If during a call there is a handover between a dominant cell and a candidate cell, then the profile may be adapted with either an adjustment to the profile entry corresponding to the candidate cell or else a new entry corresponding to the candidate cell will be added.

To illustrate certain embodiments, consider a home zone system deployed in a GSM/UMTS network in which the zone status determination is made by service logic implemented in a GSM Service Control Function (gsmSCF). The zone status for a mobile originated call could be determined by comparing the CID in the Customised Applications for Mobile networks Enhanced Logic (CAMEL) Application Part (CAP) Initial Detection Point (IDP; collectively CAP IDP) from the MSC with the CIDs in a zone profile.

If the network elements support CAMEL V4, the gsmSCF can arm the Change Of Position Detection Point in either notify or interrupt mode. If a cell handover occurs during the call, the GSM Service Switching Function (gsmSSF) will send an event report with updated location information including the new serving cell. The adaptation processing can be performed in the service logic or alternatively by an external platform which is notified of the change of cell by the gsmSCF. The processing involves checking whether the handover occurred between a dominant and a candidate cell. If this is the case, then the profile definition is updated.

Accordingly, the embodiments may enable an increase in zone reliability and/or a reduction in zone size. For a certain level of zone reliability, compared to existing network CID systems, embodiments disclosed herein may enable a zone size which is about 5%, 10%, 20%, 35%, 50%, 70% or 80% smaller. Alternatively, for a certain target zone size, compared to existing network CID systems, embodiments disclosed herein may yield reliability which is about 1%, 2%, 5%, 10%, 20%, 25% or 30% greater. In addition, embodiments disclosed herein may be used to define zones having smaller size but greater reliability than those defined using existing network CID systems.

In certain embodiments, when initially defining the zone profile, fewer cells can be included in the zone in order to achieve a smaller zone size. In the event that the profile is lacking one or more cells which do serve within the zone at certain times, the reliability of the zone detections within the zone may not meet the desired reliability for the service. Using the embodiments disclosed herein, such cells may be detected in the course of handovers and the zone profile adapted thereby increasing the zone reliability. Advantageously, this reliability improvement may be gained without requiring a change to the default zone definition rules and/or manual intervention by an operator. Typically this will result in fewer customer complaints and/or the need for manual intervention. It is of course possible to combine the disclosed adaptation with a manual intervention.

In certain existing systems, a zone detection system may employ a network CID based zone decision for billing. In addition, a SIM ToolKit (STK) applet may be deployed on the SIM card to display the current zone status to the subscriber. Typically, a zone profile is defined when the service is initialised for a subscriber. This profile is then used in the network to check the CID in CAP IDP and adjust the tariff for the call. In addition, the list of CIDs in the profile is also sent to the SIM card for use in displaying the current zone status. The STK applet monitors the current serving cell, comparing it with the CIDs in the list in order to display the current zone status on the screen.

Such systems can be enhanced by using the embodiments disclosed herein and illustrated in the exemplary messaging diagram of FIG. 11. Initially, the applet 1100 executing in the mobile radio terminal identifies the dominant elements of the CID list. The applet 1100 then monitors (i.e. checks periodically or upon the occurrence of a triggering event as described above) the serving cell selected by the handset, checking for a sequence of serving cell selections involving at least one dominant cell and at least one candidate cell. If such a sequence is observed, the applet sends a message to a server 1110 in the network that is responsible for maintaining the zone profiles in step 1140. The server requests the zone profiles from a database 1120 in step 1150 and receives the zone profiles in step 1160. The server uses the reported measurements to adapt the profile in step 1170 and then sends the updated profile to the database in step 1180, the SIM card in step 1190, and the network element 1130 in step 1200 where it is used for zone tariff adjustment.

Certain embodiments disclosed provide systems and methods for adapting zone profiles responsive to real world conditions.

Compared to existing systems, embodiments of the present disclosure enable this adaptation to be done with finer spatial precision; continuous monitoring of mobile terminal location with lower battery impact, lower network signaling load, and minimal network processing load; coverage both indoors and outdoors; and easy scalability to large numbers of users with lower infrastructure costs. Table 8 below illustrates the advantages of embodiments of the present disclosure over existing systems that could be used to continuously monitor and adapt zone profiles of multiple radio terminals.

| Technology | Mobile Battery Drain | Network Signaling and Processing Load | Network Infrastructure Cost | Accuracy |
| --- | --- | --- | --- | --- |
| Disclosure | Low | Low | Low | High |
| GMLC | Low | High | High | High |
| Cell ID | Low | Low | Low | Low |
| AGPS | High | High | High | High in most scenarios, but low indoors |
| GPS | High | Low | Low | Low in cities & indoors |

One advantage of certain embodiments is that a zone profile may be adapted to suit a variety of handset models.

Another advantage of certain embodiments is that a zone profile may be adapted to account for errors in the network database.

Another advantage of certain embodiments is that initial registration can be performed using radio propagation modeling only, while maintaining high zone reliability and stability.

Another advantage of certain embodiments is that a mobile radio terminal only solution can use a short duration, e.g. 60 seconds, of "registration" measurements to define a zone but may then achieve a high zone reliability (e.g., >90%) in urban areas.

A further advantage of certain embodiments are the adjustable precision of the adapted zones from very small areas of a few meters up to large areas.

Yet another advantage of certain embodiments is that the zone profile may adapt zone profiles in response to variations between the profiles of different RATs (e.g., 2G and 3G).

Yet another advantage of certain embodiments are that the definitions of the zones can be automatically updated to account for changes in the configuration of the radio network.

Another advantage of certain embodiments is that, from an economic standpoint, the use of the subscriber's terminal to perform the location monitoring saves the very large expenditure that would be required to achieve the same monitoring capability using a network based monitoring system. Because network traffic is limited to only those occasions when the subscriber enters a target location, yields significant spectrum efficiency.

Another advantage of certain embodiments is that, because the adaptation may be done with reference to dominant elements of the profile that were present at the original zone definition, there may be a reduced risk of what might be termed "zone creep", i.e. continual adaptations that extend the zone infinitely.

Still another advantage of certain embodiments is that reliability issues can be addressed in an automatic way by the zone detection system without waiting for customers to call to complain.

Yet another advantage is that some embodiments discourage fraud. In systems that employ a list of cells as the zone definition and lack an adaptation mechanism such as disclosed herein, there is a risk of encouraging fraudulent complaints by users. If a particular has a zone reliability issue and makes a service complaint, the typical response by the service provider would be to add extra cells to the zone definition thereby increasing the zone size. This tends to encourage subscribers to make fraudulent complaints in order to increase the region where they enjoy discounted rates. By automatically detecting reliability issues and adapting to resolve them embodiments of the present disclosure minimize or remove this incentive for fraudulent complaints.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

The disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents which fall within the range of the claims are intended to be embraced therein.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

The invention claimed is:

1. A method of updating a zone profile in a mobile radio terminal characterized by the steps of:
    storing a zone profile having a plurality of elements comprising:
        at least one dominant element corresponding to at least a first quality of a particular signal parameter; and
        at least one low priority element corresponding to at least a second quality of the particular signal parameter;
    obtaining a plurality of radio signal parameter measurements;
    determining if the plurality of radio signal parameter measurements includes measurements corresponding to at least one dominant element of the zone profile that is sufficiently adjacent to measurements corresponding to the at least one low priority element;
    modifying an existing profile element corresponding to the at least one low priority element of the zone profile responsive to determining the plurality of radio signal parameter measurements includes measurements corresponding to the at least one dominant element of the zone profile that is sufficiently adjacent to measurements corresponding to the at least one low priority element;
    determining if the plurality of radio signal parameter measurements includes measurements corresponding to at least one dominant element of the zone profile that is sufficiently adjacent to measurements corresponding to the at least one missing element; and
    adding a new element to the zone profile corresponding to at least one missing element of the zone profile responsive to determining the plurality of radio signal parameter measurements includes measurements corresponding to at least one dominant element of the zone profile that is sufficiently adjacent to measurements corresponding to the at least one missing element.

2. The method of claim 1 further comprising the step of transmitting the zone profile including the new element.

3. The method of claim 1 wherein the method is performed periodically.

4. The method of claim 3 wherein the method is performed about every hour.

5. The method of claim 1 wherein the method is triggered by a mobile radio terminal determining a zone status change.

6. The method of claim 1 wherein the method is triggered by an update of a measurement filter.

7. The method of claim 1 wherein the at least one dominant element is an element with a priority above a threshold.

8. The method of claim 1 wherein the at least one dominant element is an element with a relative priority order greater than a threshold.

9. The method of claim 1 wherein determining if the at least one dominant element of the zone profile is sufficiently adjacent further comprises determining a degree of adjacency to the low priority element.

10. The method of claim 1 wherein determining if the at least one dominant element of the profile is sufficiently adjacent further comprises determining a degree of adjacency to the missing element.

11. The method of claim 1 wherein the at least one dominant element of the profile is sufficiently adjacent if the degree of adjacency is immediately adjacent.

12. The method of claim 1 wherein the at least one dominant element of the profile is sufficiently adjacent if the degree of adjacency exceeds a threshold.

13. The method of claim 12 wherein the threshold depends on a time interval between measurements.

14. The method of claim 12 wherein the threshold depends on a zone size.

15. The method of claim 1 wherein the at least one low priority element has a priority below a threshold.

16. The method of claim 1 wherein the at least one low priority element is an element with a relative priority order below a threshold.

17. The method of claim 1, wherein determining if the plurality of radio signal parameter measurements includes measurements corresponding to at least one dominant element of the zone profile that is sufficiently adjacent to measurements corresponding to the at least one low priority element comprises:
   determining a temporal proximity of the measurements corresponding to the at least one dominant element of the zone profile and the measurements corresponding to the at least one low priority element.

18. The method of claim 17, wherein determining the temporal proximity comprises determining at least one measurement corresponding to the at least one dominant element and at least one measurement corresponding to the at least one low priority element are consecutive.

19. The method of claim 17, wherein determining the temporal proximity comprises determining the measurements corresponding to the at least one dominant element of the zone profile and the measurements corresponding to the at least one low priority element are intermingled with an alternating pattern.

20. The method of claim 1, wherein determining if the plurality of radio signal parameter measurements includes measurements corresponding to at least one dominant element of the zone profile that is sufficiently adjacent to measurements corresponding to the at least one missing element comprises:
   determining a temporal proximity of the measurements corresponding to the at least one dominant element of the zone profile and the measurements corresponding to the at least one low priority element.

21. The method of claim 1, wherein the particular signal parameter comprises at least one of a probability of serving the mobile radio terminal, round trip delay, and signal level.

22. The method of claim 1, wherein the at least the first quality of the particular signal parameter corresponds to a higher probability of serving the mobile radio terminal than the at least the second quality.

23. The method of claim 1, wherein the at least the first quality of the particular signal parameter corresponds to a higher signal level at the mobile radio terminal than the at least the second quality.

24. A SIM card configured to perform a method characterized by the steps of:
   storing a zone profile having a plurality of elements comprising:
      at least one dominant element corresponding to at least a first quality of a particular signal parameter; and
      at least one low priority element corresponding to at least a second quality of the particular signal parameter;
   obtaining a plurality of radio signal parameter measurements;
   determining if the plurality of radio signal parameter measurements includes measurements corresponding to at least one dominant element of the zone profile that is sufficiently adjacent to measurements corresponding to the at least one low priority element;
   modifying an existing profile element corresponding to the at least one low priority element of the zone profile responsive to determining the plurality of radio signal parameter measurements includes measurements corresponding to the at least one dominant element of the zone profile that is sufficiently adjacent to measurements corresponding to the at least one low priority element;
   determining if the plurality of radio signal parameter measurements includes measurements corresponding to at least one dominant element of the zone profile that is sufficiently adjacent to measurements corresponding to the at least one missing element; and
   adding a new element to the zone profile corresponding to at least one missing element of the zone profile responsive to determining the plurality of radio signal parameter measurements includes measurements corresponding to at least one dominant element of the zone profile that is sufficiently adjacent to measurements corresponding to the at least one missing element.

25. A method of updating a zone profile in a mobile radio terminal characterized by the steps of:
   storing a zone profile having a plurality of profile elements, wherein each profile element includes a cell ID associated with a priority, the plurality of profile elements comprising:
      at least one dominant element corresponding to at least a first quality of a particular signal parameter; and
      at least one low priority element corresponding to at least a second quality of the particular signal parameter;
   obtaining a plurality of cell ID measurements;
   determining if the plurality of cell ID measurements includes measurements corresponding to at least one dominant element of the zone profile that is sufficiently adjacent to measurements corresponding to the at least one low priority element;
   modifying an existing profile element having a low priority responsive to determining the plurality of cell ID measurements includes measurements corresponding to the at least one dominant element of the zone profile that is sufficiently adjacent to measurements corresponding to the at least one low priority element;
   determining if the plurality of cell ID measurements includes measurements corresponding to at least one dominant element of the zone profile that is sufficiently adjacent to measurements corresponding to the at least one missing element;
   adding to the zone profile a new profile element having a cell ID that is not included in any profile element of the zone profile responsive to determining if the plurality of cell ID measurements includes measurements corresponding to at least one dominant element of the zone profile that is sufficiently adjacent to measurements corresponding to the cell ID that is not included in any profile element of the zone profile; and
   transmitting the zone profile to a server.

* * * * *